(12) United States Patent
Seo et al.

(10) Patent No.: US 9,603,081 B2
(45) Date of Patent: Mar. 21, 2017

(54) INITIAL ACCESS METHOD AND DEVICE IN WIRELESS COMMUNICATION SYSTEM

(71) Applicant: LG Electronics Inc., Seoul (KR)

(72) Inventors: Inkwon Seo, Anyang-si (KR); Hanbyul Seo, Anyang-si (KR); Hakseong Kim, Anyang-si (KR); Seungmin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/378,874

(22) PCT Filed: Feb. 21, 2013

(86) PCT No.: PCT/KR2013/001381
§ 371 (c)(1),
(2) Date: Aug. 14, 2014

(87) PCT Pub. No.: WO2013/125873
PCT Pub. Date: Aug. 29, 2013

(65) Prior Publication Data
US 2015/0103800 A1    Apr. 16, 2015

Related U.S. Application Data

(60) Provisional application No. 61/601,552, filed on Feb. 21, 2012, provisional application No. 61/609,938, filed on Mar. 13, 2012, provisional application No. 61/700,899, filed on Sep. 14, 2012, provisional application No. 61/705,588, filed on Sep. 25, 2012.

(51) Int. Cl.
*H04W 48/10*    (2009.01)
*H04W 56/00*    (2009.01)
*H04J 11/00*    (2006.01)
*H04W 48/16*    (2009.01)
*H04W 72/04*    (2009.01)
*H04L 5/00*    (2006.01)

(52) U.S. Cl.
CPC ......... *H04W 48/10* (2013.01); *H04J 11/0079* (2013.01); *H04L 5/0094* (2013.01); *H04W 48/16* (2013.01); *H04W 56/00* (2013.01); *H04W 72/042* (2013.01); *H04L 5/0007* (2013.01)

(58) Field of Classification Search
CPC ...... H04W 48/08; H04W 48/10; H04W 48/16
See application file for complete search history.

(56) References Cited

U.S. PATENT DOCUMENTS 5,862,487 A    1/1999    Fujii et al.
2010/0189032 A1    7/2010    Chen et al.
(Continued)

FOREIGN PATENT DOCUMENTS

KR    10-2010-0048859    5/2010
KR    10-2011-0027525    3/2011
KR    10-2011-0072729    6/2011

*Primary Examiner* — Feben M Haile
(74) *Attorney, Agent, or Firm* — Dentons US LLP

(57) ABSTRACT

The present invention relates to a terminal's initial access method in a wireless communication system, the method including: obtaining information including a cell identification (ID) from a synchronous signal; and receiving any one of a first physical broadcast channel (PBCH) and a second PBCH channel depending on to which of a preset range the cell ID corresponds.

20 Claims, 17 Drawing Sheets

(56) References Cited

U.S. PATENT DOCUMENTS

| | | |
|---|---|---|
| 2010/0195525 A1 | 8/2010 | Eerolainen et al. |
| 2011/0129008 A1* | 6/2011 | Chmiel ................ H04J 11/0073 375/224 |
| 2013/0044678 A1* | 2/2013 | Qu ...................... H04W 52/244 370/328 |
| 2013/0051373 A1* | 2/2013 | Ro ........................ H04W 56/00 370/336 |
| 2013/0201942 A1* | 8/2013 | Kim ................... H04W 76/045 370/329 |

* cited by examiner

MeNB : macro eNodeB
PeNB : pico eNodeB
FeNB : femto eNodeB

MUE : macro UE
PUE : pico UE
FUE : femto eNodeB

INITIAL ACCESS METHOD AND DEVICE IN WIRELESS COMMUNICATION SYSTEM This application is a 35 USC §371 National Stage entry of International Application No. PCT/KR2013/001381 filed on Feb. 21, 2013, and claims priority to U.S. Provisional Application Ser. Nos. 61/601,552 filed on Feb. 21, 2012, 61/609,938 filed on Mar. 13, 2012, 61/700,899 filed on Sep. 14, 2012, and 61/705,588 filed on Sep. 25, 2012 which are hereby incorporated by reference in their entireties as if fully set forth herein.

TECHNICAL FIELD

The present invention relates generally to a wireless communication system and, more particularly, to an initial access method and device.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in an initial access method in preparation for introduction of an enhanced physical downlink control channel (EPDCCH) and a new carrier type (NCT).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is an initial access method for a user equipment (UE) in a wireless communication system including acquiring information including a cell identification (ID) from a synchronous signal, and receiving one of a first Physical Broadcast Channel (PBCH) and a second PBCH according to a predefined range the cell ID belongs to.

According to a second aspect of the present invention, provided herein is a user equipment in a wireless communication system including a receive module, and a processor, wherein the processor acquires information including a cell identification (ID) from a synchronous signal, and receives one of a first Physical Broadcast Channel (PBCH) and a second PBCH depending on where the cell ID is positioned in a predefined range The first and second aspects of the present invention may include the following details.

The first PBCH may be transmitted on a time resource corresponding to first four OFDM symbols of a second slot of subframe #0 and a frequency resource corresponding to center six resource blocks in an entire frequency bandwidth, and the second PBCH may be transmitted on a time resource corresponding to entire OFDM symbols of a predetermined subframe and a frequency resource corresponding to at least one part of six physical resource block pairs in the entire frequency bandwidth.

When the UE needs to receive the second PBCH, the UE may perform blind decoding for the physical resource block pairs.

The predetermined subframe and the physical resource block pairs may include a resource region, the synchronous signal being transmitted in the resource region.

The predetermined subframe to where the PBCH is transmitted therein may be indicated by the cell ID.

The second PBCH may be based on a demodulation reference signal, and information for demodulating the demodulation reference signal may be acquired from the cell ID.

The information for demodulating the demodulation reference signal may include information related to antenna ports and a scrambling sequence.

The second PBCH may include information related to a common search space of an Enhanced Physical Downlink Control Channel (EPDCCH).

Upon receiving the second PBCH, the UE may perform random access based on the common search space.

The information related to the common search space may include at least one of resource region position information about the common search space and information related to antenna ports and a scrambling sequence for demodulating a demodulation reference signal, the EPDCCH being based on the demodulation reference signal.

The cell ID may be acquired by one of a first synchronization channel (SCH) and a second synchronization channel (E-SCH).

A parameter for producing sequences to be transmitted on the first synchronization channel and the second synchronization channel may be different between the synchronization channels.

When the cell ID is acquired from the second synchronization channel, the UE may receive the second PBCH alone.

The second PBCH may include information about frame timing.

Advantageous Effects

According to an embodiment of the present invention, an initial access procedure may be efficiently implemented when EPDCCH and NCT are introduced.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
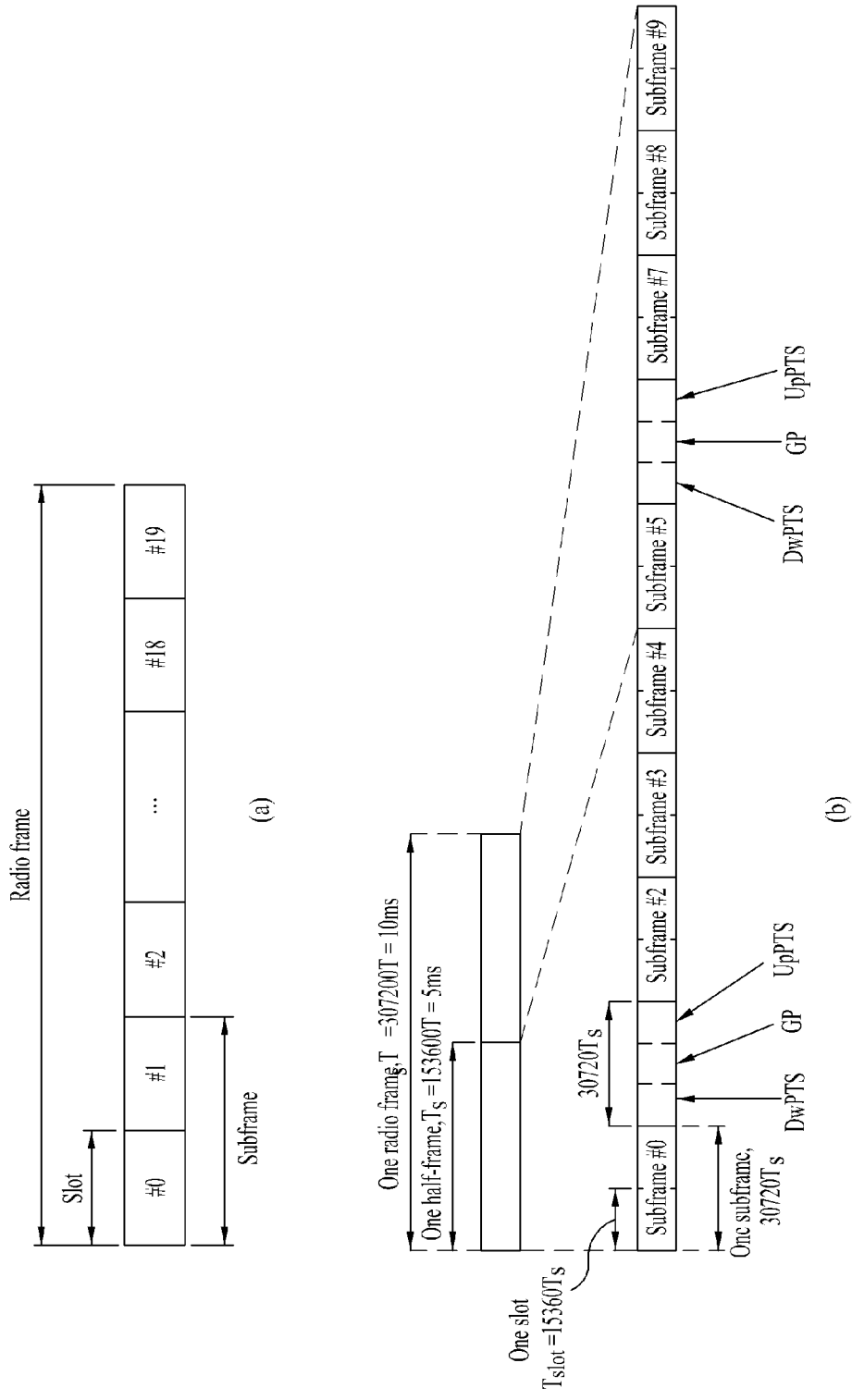
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
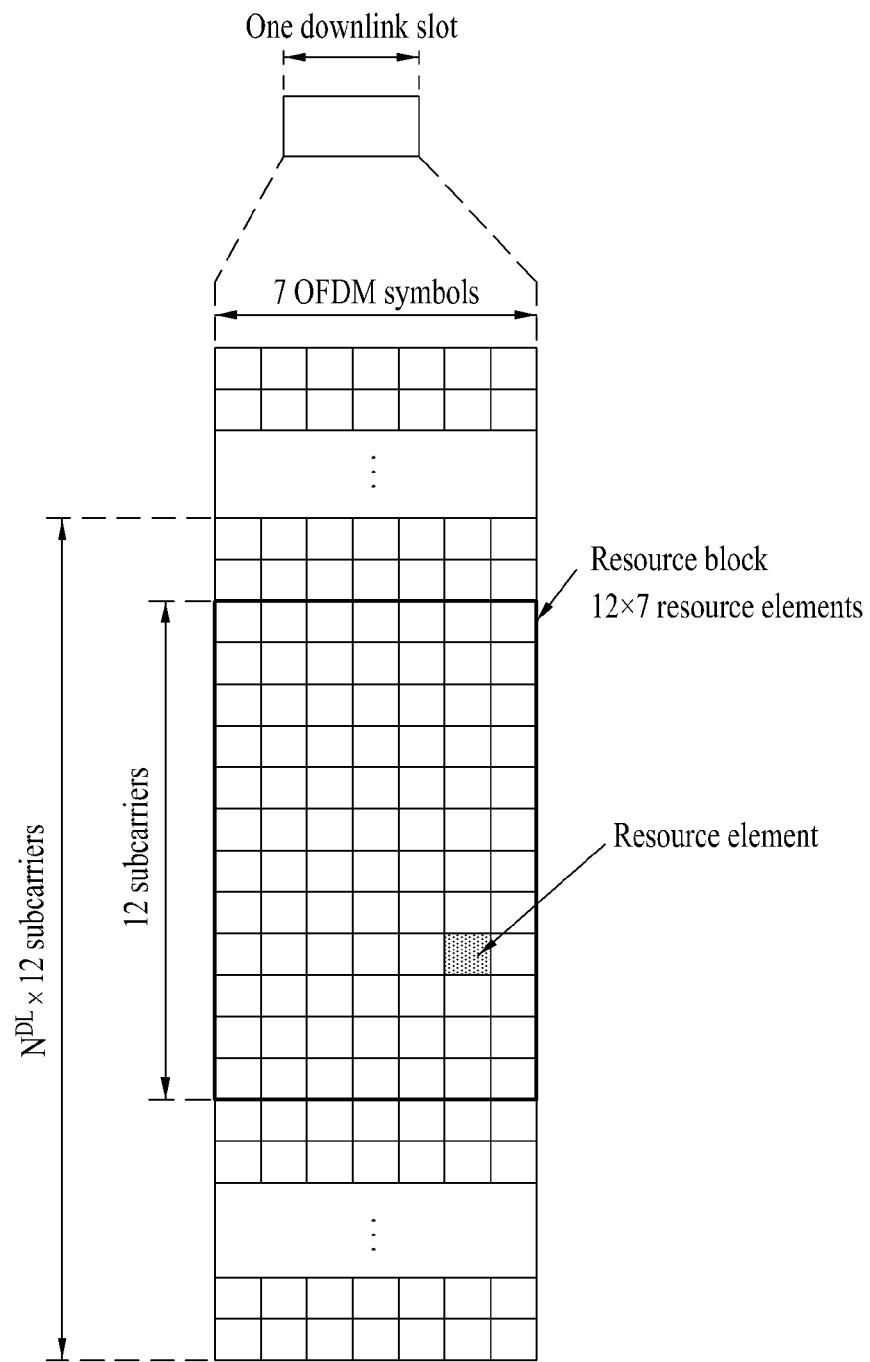
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
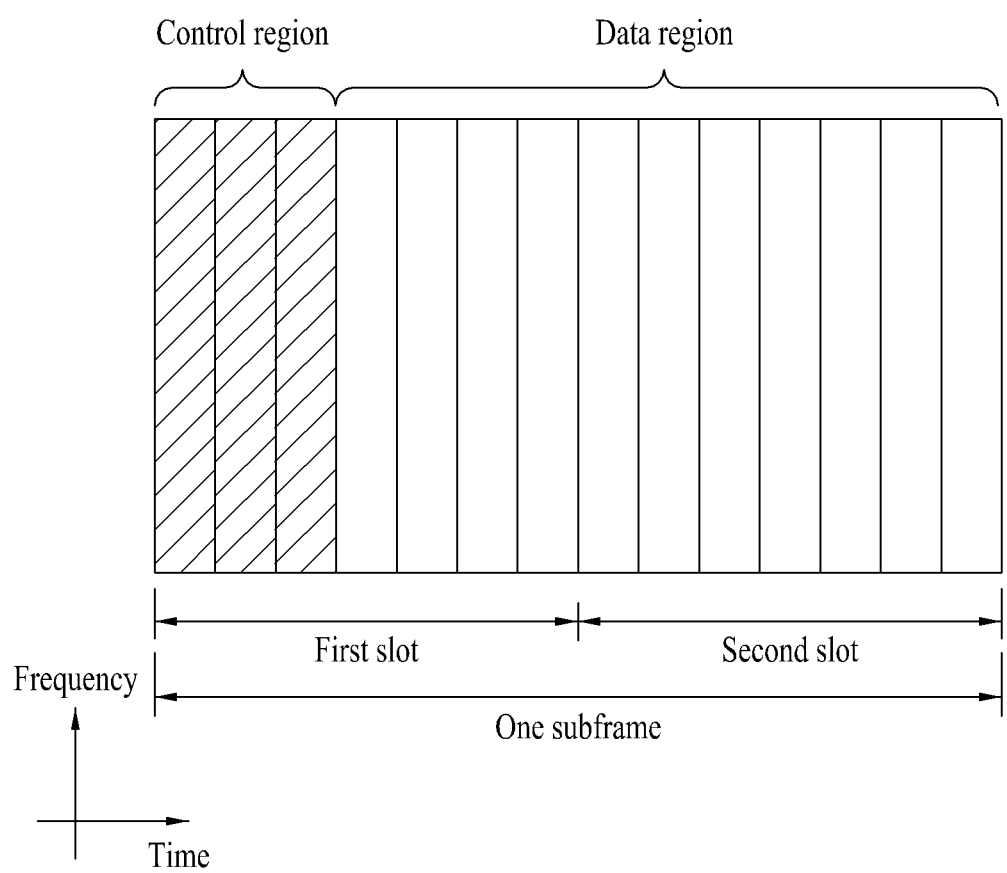
FIG. 3 is a diagram illustrating a DL subframe structure.

FIG. 3 illustrates a DL subframe structure. Up to first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
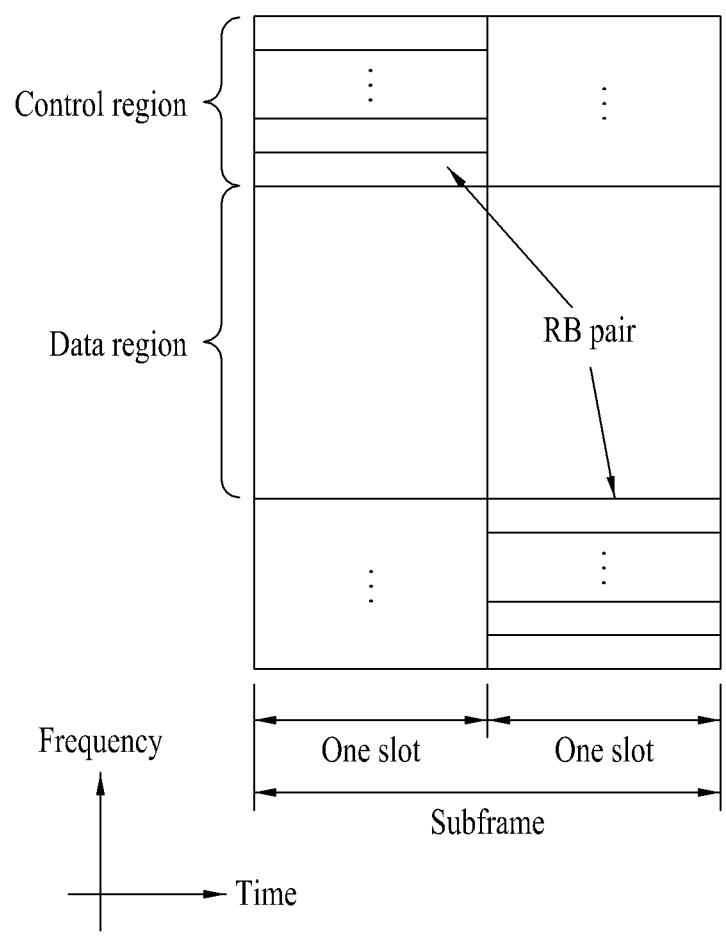
FIG. 4 is a diagram illustrating an uplink (UL) subframe structure

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Heterogeneous Deployments

Figure 5:
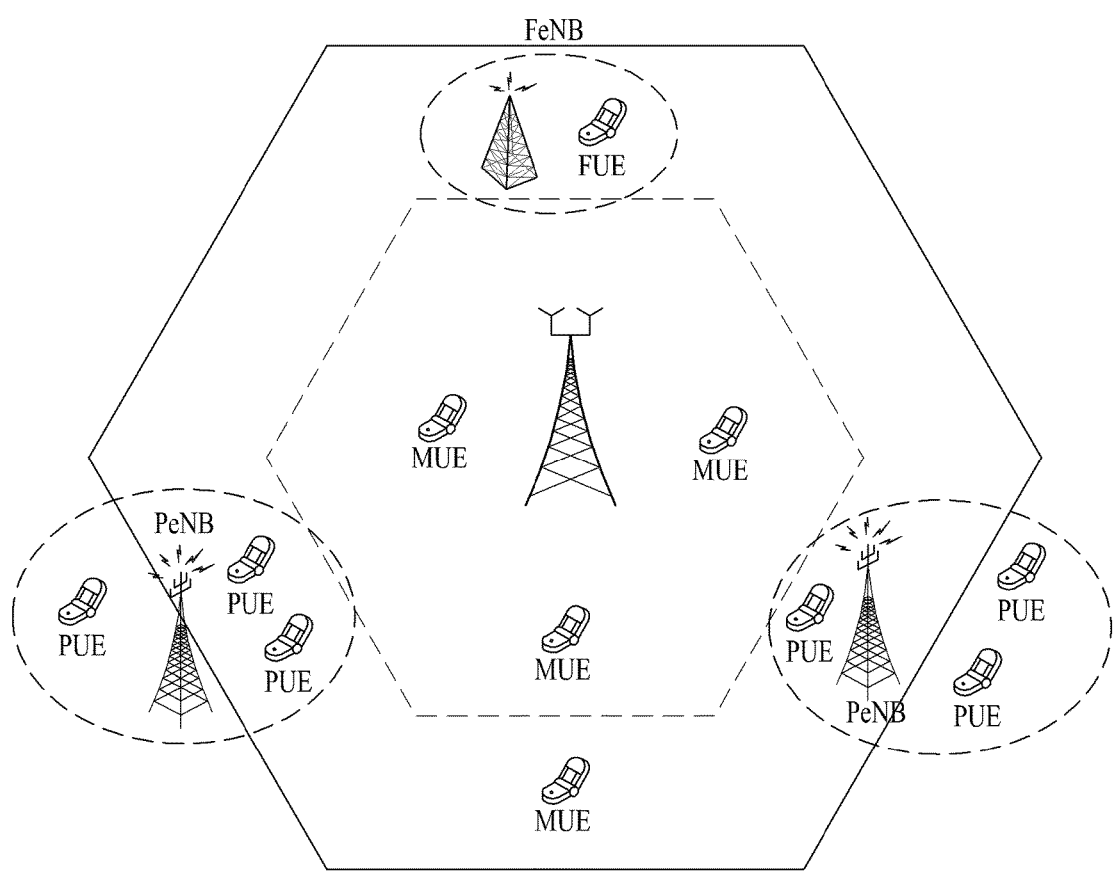
FIG. 5 is a diagram illustrating a heterogeneous network.
Figure 6:
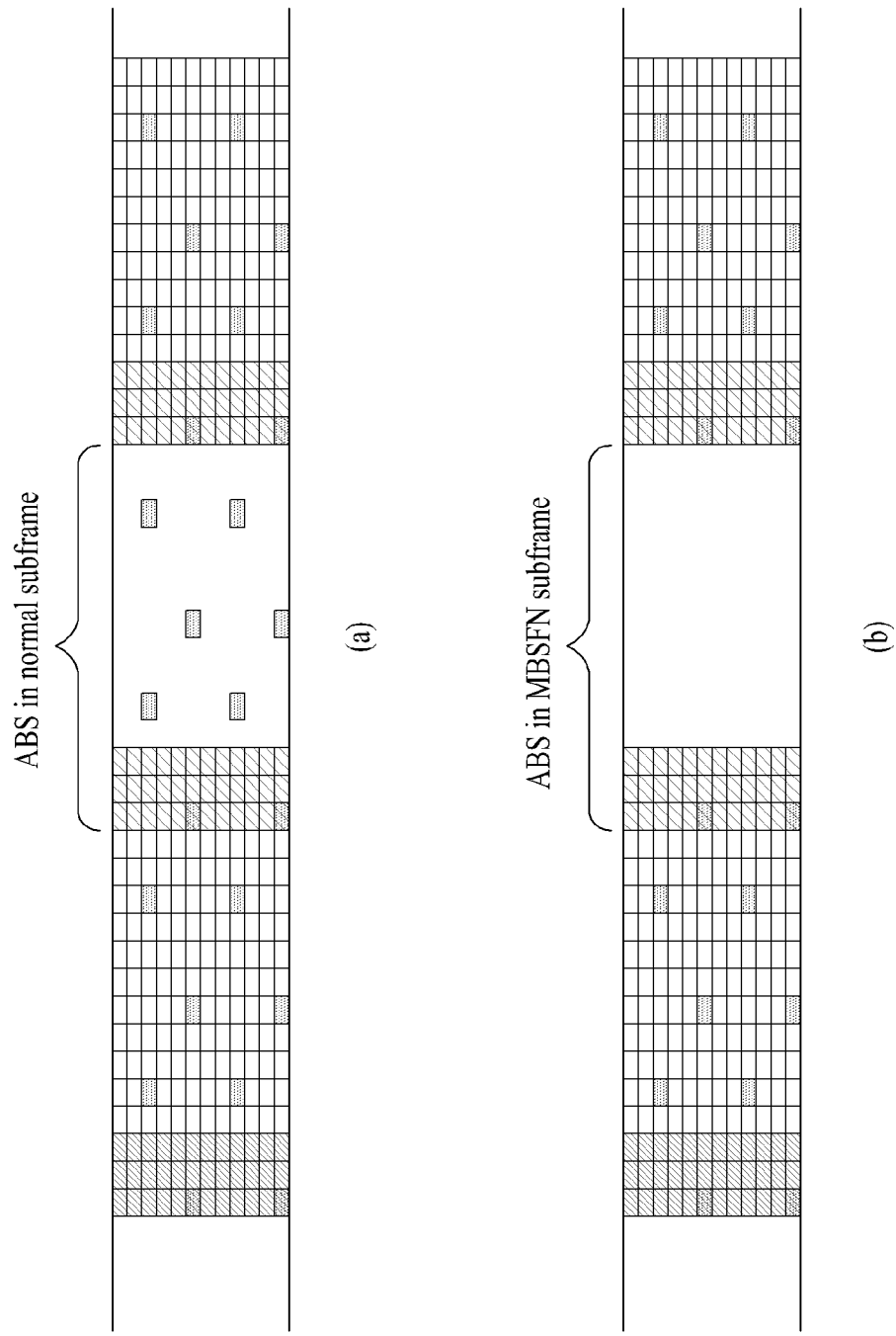
FIG. 6 is a diagram illustrating an absolute blank subframe (ABS)

FIG. 5 illustrates a heterogeneous network wireless communication system including a macro eNB (MeNB) and micro eNBs (PeNBs or FeNBs). The term "heterogeneous network" refers to a network in which an MeNB and a PeNB or FeNB coexist even when they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Inter-Cell Interference Control (ICIC)

In the heterogeneous network environment as described above, interference between neighboring cells may be a problem. To address such inter-cell interference, inter-cell interference control (ICIC) may be applied. Conventional ICIC may be applied to frequency resources or time resources.

As exemplary ICIC for the frequency resources, 3GPP LTE Release-8 defines a scheme of dividing a given frequency region (e.g., a system bandwidth) into one or more sub-regions (e.g., physical resource blocks (PRBs)) and exchanging an ICIC message for each frequency sub-region between cells. For example, as information included in the ICIC message for the frequency resources, relative narrowband transmission power (RNTP), which is related to downlink transmission power, and UL interference overhead indication (IOI) and UL high interference indication (HII), which are related to uplink interference, are defined.

The RNTP is information indicating downlink transmission power used by a cell that transmits an ICIC message in a specific frequency sub-region. For example, setting an RNTP field for a specific frequency sub-region to a first value (e.g. 0) may mean that downlink transmission power of a corresponding cell does not exceed a predetermined threshold value in the specific frequency sub-region. Setting the RNTP field for the specific frequency sub-region to a second value (e.g., 1) may mean that the corresponding cell cannot guarantee the downlink transmission power in the specific frequency sub-region. In other words, the downlink transmission power of the cell can be regarded as low when the RNTP field is 0, whereas the downlink transmission power of the cell cannot be regarded as low when the RNTP field is 1.

The UL IOI is information indicating the amount of uplink interference that a cell transmitting an ICIC message suffers from (or is subjected to) in a specific frequency sub-region. For example, an IOI field for a specific frequency sub-region set to a value corresponding to a high amount of interference may suggest that a corresponding cell suffers strong uplink interference in the specific frequency sub-region. In a frequency sub-region corresponding to IOI indicating strong uplink interference, a cell having received an ICIC message may schedule UEs that use low uplink transmission power from among UEs thereof. Thereby, UEs perform uplink transmission with low transmission power in the frequency sub-region corresponding to the IOI indicating strong uplink interference, and thus uplink interference that a neighboring cell (i.e. a cell having transmitted the ICIC message) suffers may be attenuated.

The UL HII is information indicating a degree of interference (or uplink interference sensitivity) that may be generated for a corresponding frequency sub-region according to uplink transmission in a cell transmitting an ICIC message. For example, if an HII field is set to a first value (e.g., 1) for a specific frequency sub-region, it may suggest that the cell transmitting the ICIC message can schedule UEs having high uplink transmission power for the specific frequency sub-region. On the other hand, if the HII field is set to a second value (e.g., 0) for the specific frequency sub-region, it may suggest that the cell transmitting the ICIC message can schedule UEs having low uplink transmission power for the specific frequency sub-region. Meanwhile, a cell having received the ICIC message may avoid interference from the cell having transmitted the ICIC message by scheduling UEs preferentially in a frequency sub-region for which the HII field is set to the second value (e.g., 0) and scheduling UEs capable of successfully operating in a strong interference environment in a frequency sub-region for which the HII field is set to the first value (e.g., 1).

As exemplary ICIC for the time resources, 3GPP LTE-A (or 3GPP LTE Release-10) defines a scheme of dividing the entire time domain into one or more time sub-regions (e.g., subframes) in the frequency and exchanging information about whether silencing is performed for each time sub-region between cells. A cell transmitting an ICIC message may transmit, to neighboring cells, information indicating that silencing is performed in a specific subframe, and does not schedule a PDSCH or a PUSCH in the specific subframe. The cell receiving the ICIC message may schedule uplink and/or downlink transmission for UEs in the subframe in which silencing is performed in the cell having transmitted the ICIC message.

Silencing may refer to an operation in which a specific cell does not transmit signals (or transmits zero power or weak power) in a specific subframe on uplink and downlink. As an example of silencing, a specific cell may set a specific subframe as an almost blank subframe (ABS). There may be two types of ABSs. Specifically, one type is an ABS in a normal subframe in which a cell specific reference signal (CRS) is transmitted while a data region is left vacant and the other type is an ABS in an MBSFN subframe in which even the CRS is not transmitted. In the ABS in a normal subframe, there may be some interference due to the CRS. The ABS in an MBSFN subframe has an advantage in terms of interference, but use thereof is limited. Accordingly, the two ABSs may be used together.

Handover/Random Access Procedure

Hereinafter, handover and the random access procedures conducted in an LTE system will be discussed in detail.

Figure 7:
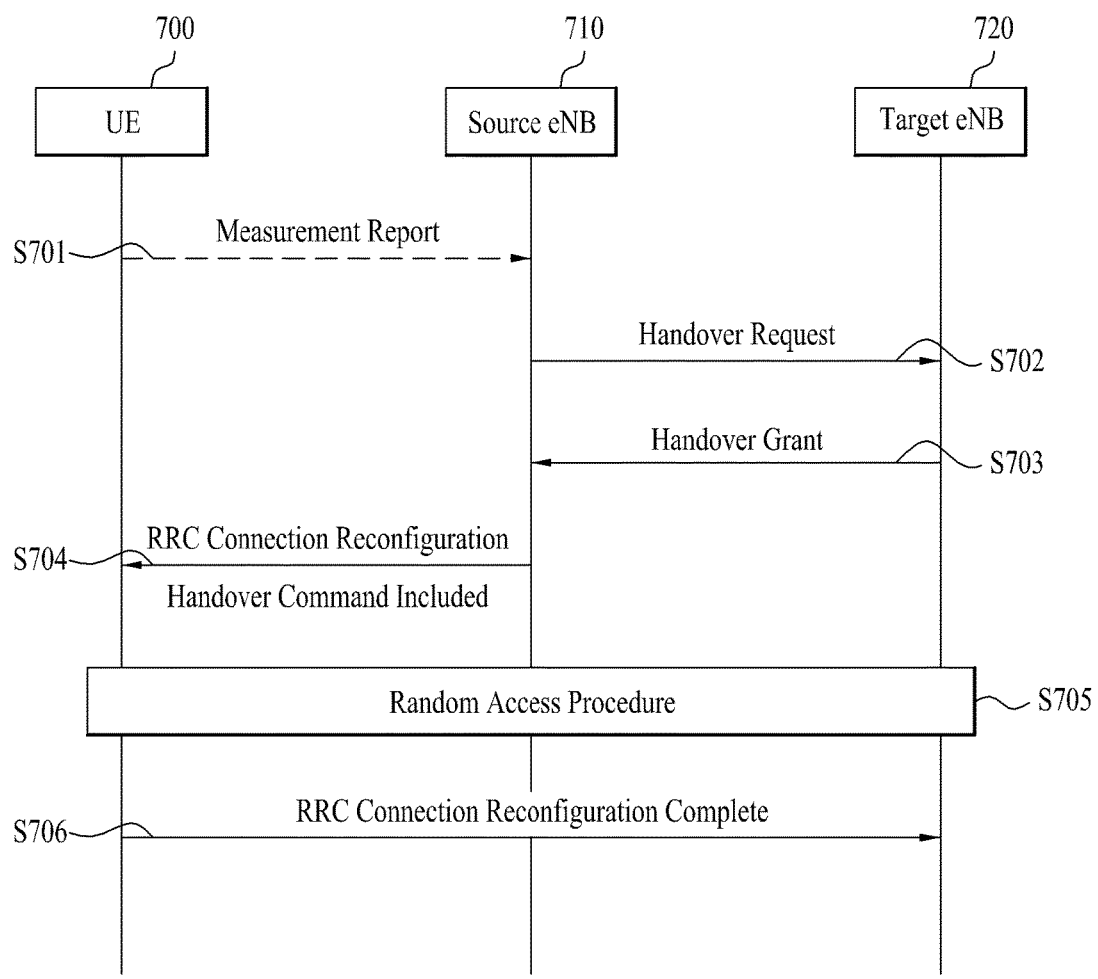
FIG. 7 is a diagram illustrating a handover procedure.

FIG. 7 is a diagram illustrating a handover procedure. Referring to FIG. 7, when a handover trigger occurs while a UE 700 monitors measurement values from a serving eNB 710 currently connected to the UE 700 and neighboring cells, the UE 700 transmits a measurement report message to the serving eNB 710 (S701). Herein, the measurement report may include reference signal receive power (RSRP), received signal strength indicator (RSSI), and reference signal received quality (RSRQ).

RSRP is a measurement value that can be obtained by measuring the magnitude of a CRS on downlink. RSSI, which is a value of total reception power received by a UE, is a measurement value including interference and noise power from neighboring cells. RSRQ is a measurement value measured in the form of N*RSRP/RSSI, where N is the number of RBs of a corresponding bandwidth obtained through RSSI measurement.

Whether to transmit a measurement report may be determined according to the following event-based measurement report decision conditions.

i) A measurement value for the serving cell is greater than an absolute threshold value (Serving cell becomes better than absolute threshold).

ii) A measurement value for the serving cell is less than the absolute threshold value (Serving cell becomes worse than absolute threshold).

iii) A measurement value for a neighboring cell is greater than a measurement value of the serving cell by an offset value (Neighboring cell becomes better than an offset relative to the serving cell).

iv) A measurement value for a neighboring cell is greater than an absolute threshold value (Neighboring cell becomes better than absolute threshold).

v) A measurement value for the serving cell is less than the absolute threshold value, and a measurement value for a neighboring cell is greater than another absolute threshold value (Serving cell becomes worse than one absolute threshold and Neighboring cell becomes better than another absolute threshold).

Herein, the measurement value may be an RSRP or the like.

In addition, a measurement report may be transmitted only when each of the measurement report decision conditions described above is maintained for at least a predetermined time set in the network.

Figure 8:
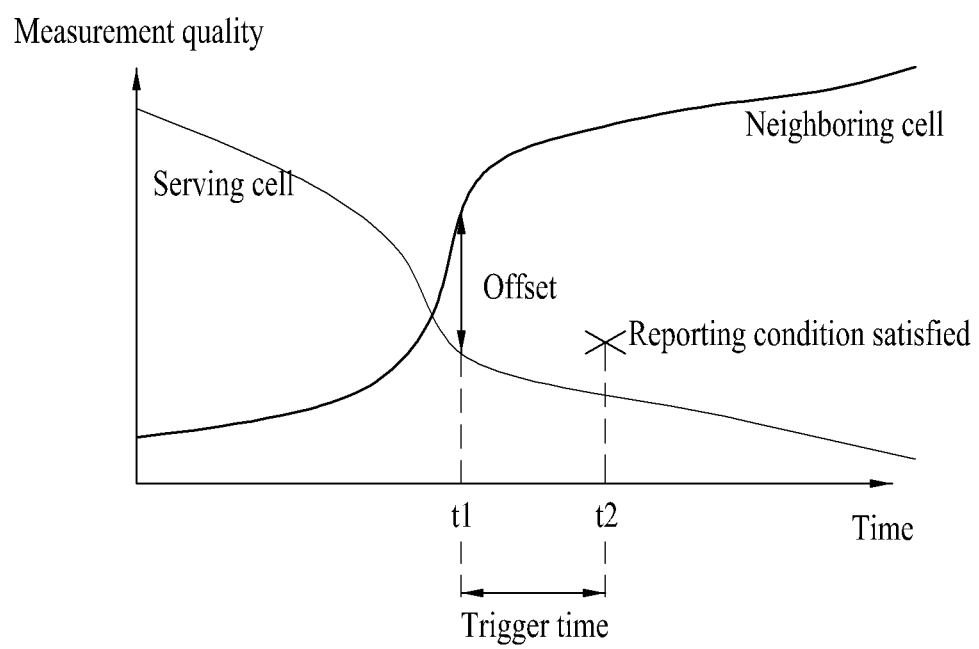
FIG. 8 illustrates determination of whether to transmit a measurement report in a handover procedure.

Of the measurement report decision conditions, condition iii) will be described in detail below with reference to FIG. 8. A UE persistently measures RSRP and the like for the serving cell and a neighboring cell. As the UE keeps approaching the neighbor cell, if a predetermined time (time to trigger) t2 elapses after a specific time t1 at which the RSRP for the neighboring cell is higher than the RSRP for the serving cell by an offset value, the UE may perform measurement reporting to the serving cell. Herein, the offset value and the predetermined time may be set by the network.

Subsequently, the serving eNB 710 having received the measurement report from the UE 700 transmits a handover request to a target eNB 720 (S702). At this time, the serving eNB 710 provides radio resource control (RRC) context information of the UE 700 to the target eNB 720.

The target eNB 720 determines, based on the RRC context information, whether the UE is to be handed over. If the handover is determined, the target eNB 720 generates a handover command, and the serving eNB 710 transmits an RRC connection reconfiguration (RRCConnectionReconfiguration) message including the handover command to the UE 700 (S704). The RRC connection reconfiguration message may include radio resource configuration information, security configuration, and cell-RNTI (C-RNTI), which are commonly applied to the UEs covered by the target eNB 720.

Upon receiving the RRC connection reconfiguration message, the UE 700 initiates a procedure of random access to the target eNB 720 (S705). When the random access procedure is successfully completed, the UE 700 transmits an RRC connection reconfiguration complete (RRC ConnectionReconfigurationComplete) message to the target eNB 720, thereby terminating the handover procedure (S706).

Hereinafter, the random access procedure of the handover procedure will be described in detail. In LTE, a UE can perform the random access procedure in the following cases.

The UE performs initial access since there is no RRC connection to an eNB.

The UE accesses a target cell for the first time in a handover procedure.

The random access procedure is requested by a command of the eNB.

Data for uplink occurs when uplink time synchronization is not implemented, or a predetermined radio resource used to request a radio resource is not allocated.

A recovery procedure is performed due to radio link failure or a handover failure.

Hereinafter, a normal contention-based random access procedure will be described.

Figure 9:
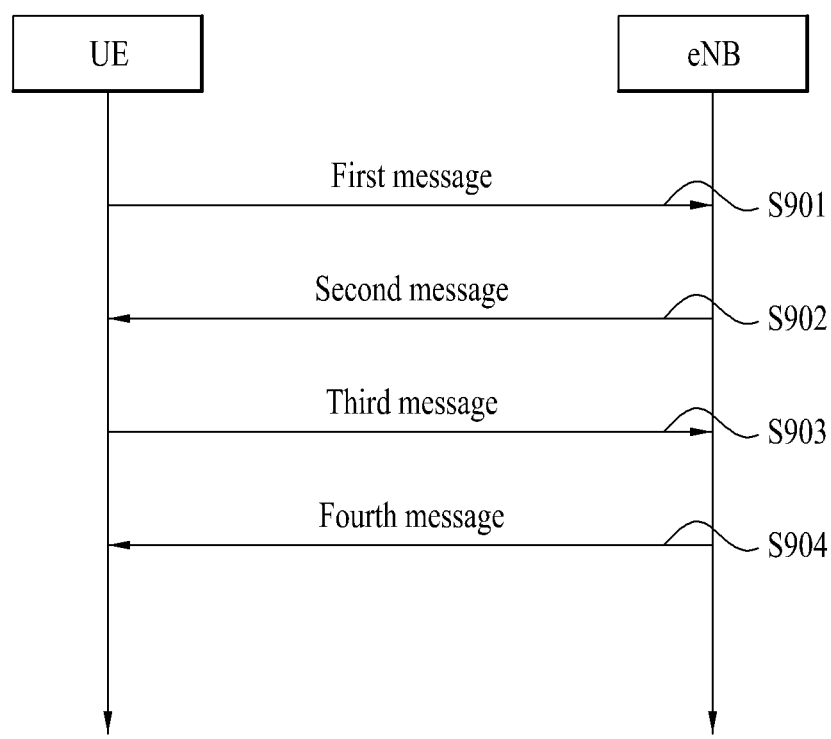
FIG. 9 illustrates a random access procedure.

FIG. 9 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S901).

(2) Reception of Second Message

After transmitting the random access preamble, the UE attempts to receive a random access response thereof within a random access response reception window indicated through the system information or Handover Command by an eNB (S902). More specifically, the random access response information may be transmitted in the format of a MAC (Media Access Control) PDU (Protocol Data Unit) and the MAC PDU may be transmitted on a PDSCH. To properly receive the information transmitted on the PDSCH, the UE preferably monitors a physical downlink control channel (PDCCH). That is, the PDCCH preferably carries information about a UE to receive the PDSCH, frequency and time information about radio resources of the PDSCH, and information about the transmission format of the PDSCH. Once the UE succeeds in receiving a PDCCH transmitted thereto, the UE may properly receive the random access response on the PDSCH based on the information of the PDCCH. The random access response may include a random access preamble identifier (RAPID), a UL Grant indicating UL radio resources, a Temporary C-RNTI, and a Timing Advance Command (TAC).

As described above, the RAPID is needed in the random access response to indicate a UE to which the UL Grant, the Temporary C-RNTI, and the TAC are valid since one random access response may include random access response information for one or more UEs. It is assumed in this step that the UE selects a RAPID identifying the random access preamble that has been selected in step S902. Thus, the UE may receive the UL Grant, the Temporary C-RNTI, and the timing advance command (TAC).

(3) Transmission of Third Message

If the UE receives a valid random access response, the UE processes the information included in the random access response. That is, the UE applies the TAC and stores the Temporary C-RNTI. In addition, the UE may store data to be transmitted in a message-3 buffer, in response to the received valid random access response.

The UE transmits the data (i.e., a third message) to the eNB based on the received UL Grant (S903). The third message should include an ID of the UE. This is because the eNB cannot determine which UEs perform the random access procedure in the contention-based random access procedure and the UEs need to be identified for contention resolution.

Two methods have been discussed to include a UE ID in the third message. According to a first method, if the UE has a valid C-RNTI already allocated by a corresponding cell before the random access procedure, the UE transmits the C-RNTI by a UL transmission signal corresponding to the UL Grant. On the other hand, if a valid C-RNTI has not been allocated to the UE before the random access procedure, the UE transmits its unique ID (e.g., an SAE Temporary Mobile Subscriber Identity (S-TMSI) or a Random ID) in the third message. In general, a UE ID is longer than a C-RNTI. Once the UE has transmitted data corresponding to the UL Grant, the UE starts a contention resolution timer (hereinafter referred to as "CR timer").

(4) Reception of Fourth Message

After transmitting the data including its ID according to the UL Grant included in the random access response, the UE awaits instruction from the eNB, for contention resolution. That is, the UE attempts to receive a PDCCH in order to receive a specific message (S904). There are two methods for receiving the PDCCH. As described above, if the third message transmitted according to the UL Grant includes a C-RNTI, the UE attempts to receive a PDCCH using the C-RNTI thereof. If the third message includes the UE ID, the UE may attempt to receive a PDCCH using the Temporary C-RNTI included in the random access response. In the former case, if the UE receives the PDCCH using the C-RNTI thereof before the CR timer expires, the UE determines that the random access procedure has been normally performed and terminates the random access procedure. In the latter case, if the UE receives a PDCCH using the Temporary C-RNTI before the CR timer expires, the UE checks data received on a PDSCH indicated by the PDCCH. If the data includes the ID of the UE, the UE determines that the random access procedure has been normally performed and terminates the random access procedure.

In the case of non-contention-based random access, the random access procedure is terminated simply by transmitting the first and second messages, unlike the case of the contention-based random access procedure illustrated in FIG. 9. Note that before the UE transmits a random access preamble as the first message to the eNB, the eNB allocates the random access preamble to the UE. The UE transmits the allocated random access preamble as the first message to the eNB and receives a random access response from the eNB. Thereby, the random access procedure is terminated.

Primary Synchronous Signal (PSS)/Secondary Synchronous Signal (SSS)

Figure 10:
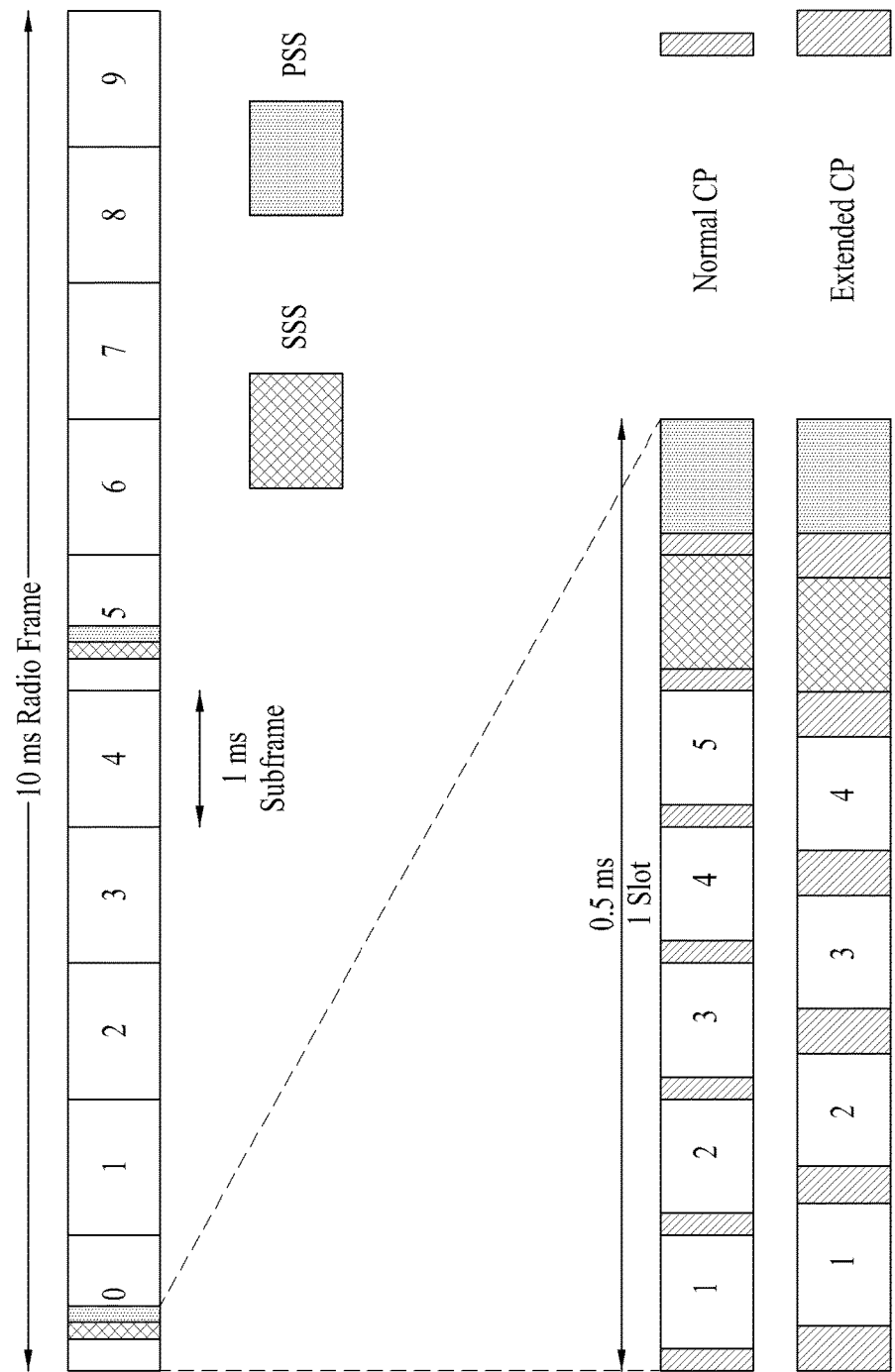
FIG. 10 is a diagram illustrating a PSS/SSS in an FDD system.

FIG. 10 illustrates a primary synchronous signal (PSS) and a secondary synchronous signal (SSS) used in cell search in an LTE/LTE-A system. The PSS and SSS will be described after cell search is discussed. Cell search, which is performed to implement handover from a currently connected cell to another cell or cell reselection when the UE accesses a cell for the first time, may include acquisition of frequency and symbol synchronization for the cell, acquisition of downlink frame synchronization for the cell, and determination of a cell ID. Three cell identifiers may constitute one cell group, and there may be 168 cell groups.

The eNB transmits a PSS and an SSS for cell search. The UE may acquire the 5 ms timing of the cell by detecting the PSS, and recognize the cell ID within a cell group. Further, the UE may recognize the radio frame timing and cell group by detecting the SSS.

Referring to FIG. 10, a PSS is transmitted in subframe #0 and subframe #5. More specifically, the PSS is transmitted at the last OFDM symbol of the first slot in subframe #0 and subframe #5. Further, an SSS is transmitted in the second OFDM symbol from the last symbol of the first slot in subframe #0 and subframe #5. That is, the SSS is transmitted in the OFDM symbol immediately prior to transmission of the PSS. Such transmission timing is for FDD. For TDD, the PSS is transmitted in the third symbol of subframes #1 and #6, i.e., DwPTS, and the SSS is transmitted in the last symbol of subframes #0 and #5. That is, in TDD, the SSS is transmitted in a symbol which is three symbols ahead of the symbol where the PSS is transmitted.

The PSS is a Zadoff-Chu sequence having a length of 63. In actual transmission, 0 is padded to both ends of the sequence, and the sequence is transmitted on 73 subcarriers (72 subcarriers if DC subcarrier is exempted, i.e., 6 RB) in the middle of the system frequency bandwidth. The SSS consists of a sequence having a length of 62, which is formed by frequency interleaving two sequences having a length of 31 each, and is transmitted on 72 subcarriers in the middle of the entire system bandwidth as in the case of the PSS.

Physical Broadcast Channel (PBCH)

Figure 11:
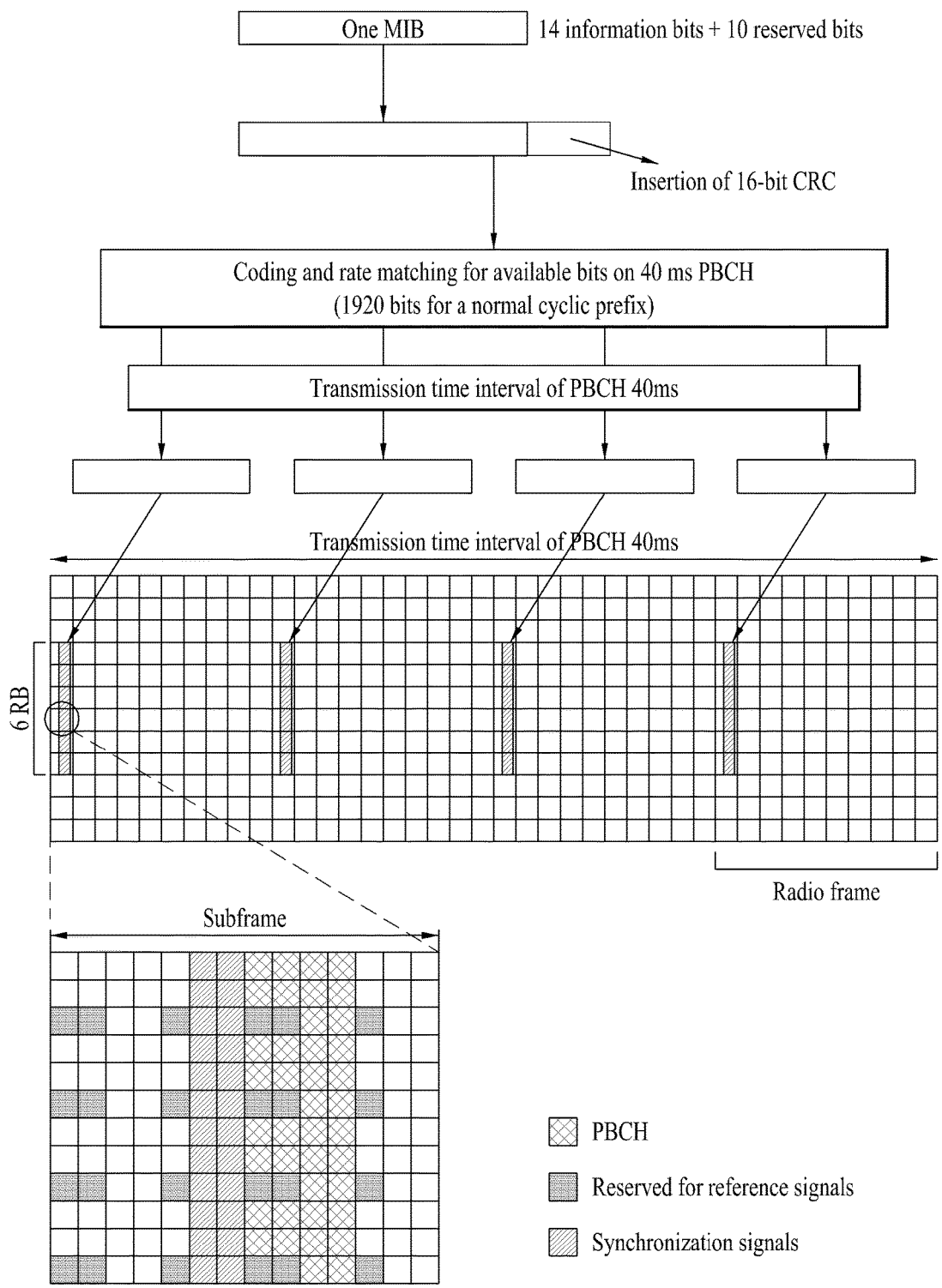
FIG. 11 is a diagram illustrating a PBCH.

FIG. 11 is a diagram illustrating a PBCH. The PBCH is a channel on which system information corresponding to a master information block (MIB) is transmitted. The PBCH is used to acquire the system information after the UE acquires synchronization and a cell ID through the PSS/SSSS described above. Herein, the MIB may include DL cell bandwidth information, PHICH configuration information, and a subframe number (system frame number, SFN).

For the MIB, an MIB transmission block is transmitted through the first subframe of each of four consecutive radio frames. More specifically, the PBCH is transmitted in the first four OFDM symbols of the second slot of subframe #0 in each of the four consecutive radio frames.

Figure 12:
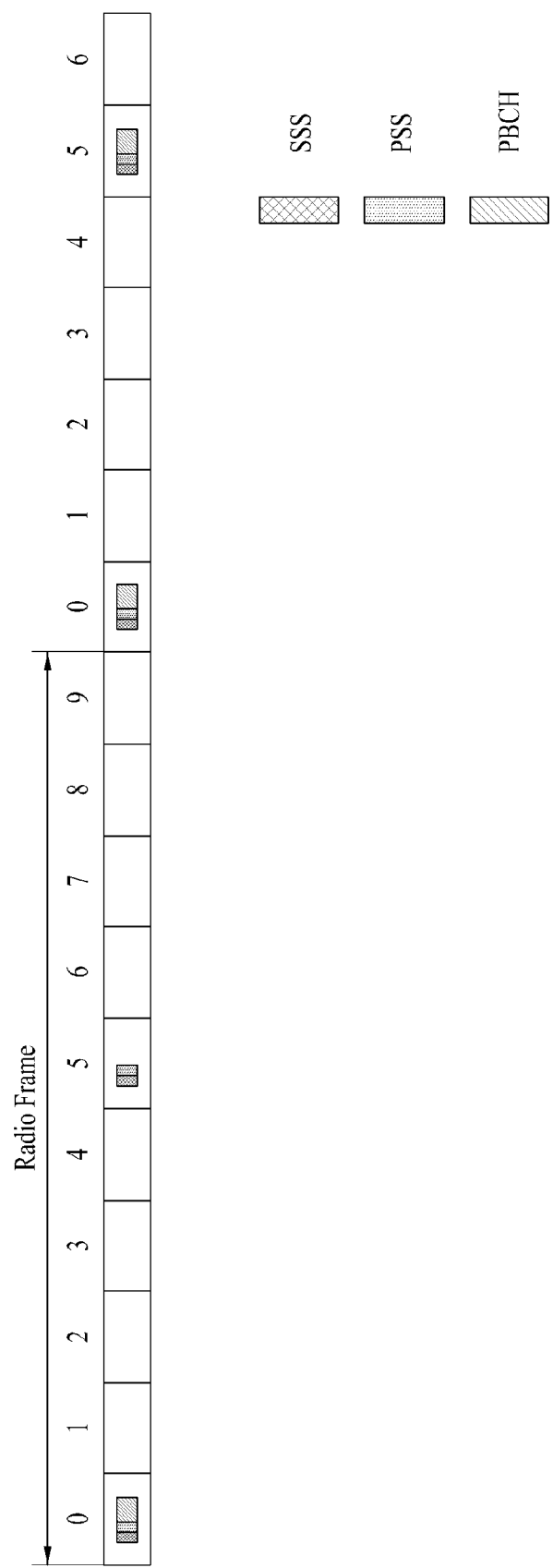
FIG. 12 shows the PSS/SSS and the PBCH together.

The transmission timing of the PSS/SSS and the PBCH for an FDD system is illustrated in FIG. 12. Referring to FIG. 12, in each radio frame, the PSS/SSS is transmitted in the last two OFDM symbols of the first slot of subframe #0, and the PBCH is subsequently transmitted in the first four OFDM symbols of the second slot. In addition, the SSS and the PSS are respectively transmitted in the last two OFDM symbols of the first slot of subframe #5.

Enhanced PDCCH (EPDCCH)

In an LTE system after Release 11, an enhanced-PDCCH (EPDCCH) is considered as a solution to lack of capacity of a PDCCH due to coordinated multi-point (CoMP), multi user-multiple input multiple output (MU-MIMO), and the like and degradation of PDCCH performance due to inter-cell interference. In addition, with the EPDCCH, channel estimation may be performed based on DMRSs contrary to the existing CRS-based PDCCH in order to obtain a precoding gain. In the entire DL bandwidth, a plurality of physical resource block (PRB) pairs may be configured for transmission of an EPDCCH. One PRB pair may include four enhanced CCEs (eCCEs), and each eCCE may include four enhanced resource element groups (eREGs). EPDCCHs may be divided into a localized EPDCCH and a distributed EPDCCH according to resource allocation types.

The localized EPDCCH may be transmitted on the eCCE-by-eCCE basis, and an antenna port may be configured for each eCCE. For the distributed EPDCCH, eREGs belonging to different PRB pairs may constitute an eCCE to implement EPDCCH transmission, and an antenna port may be configured for each eREG. Depending on the aggregation level (e.g., 1, 2, 4, 8, (16)), a plurality of eCCEs may be used for transmission of one EPDCCH (or DCI). For example, one DCI may be transmitted using one eCCE in aggregation level 1, and may be transmitted using two eCCEs in aggregation level 2. Since an antenna port is configured for each eCCe, which is a resource unit for transmission of an EPDCCH, in a PRB pair as described above (e.g., antenna ports 7, 8, 9 and 10 are configured for four eCCEs), an EPDCCH for one UE may happen to use two or more antenna ports if the aggregation level is higher than 2. In addition, an EPDCCH for one UE may use two or more antenna ports even in the case in which two DCIs (e.g., DCI for DL allocation and DCI for UL grant) are transmitted to one UE.

Hereinafter, a description will be given of an enhanced initial access procedure implemented by sequentially performing acquisition of synchronization, a cell ID, and frame timing over an SCH, acquisition of system information over a PBCH, and a PDCCH-based random access procedure based on the descriptions given above. The enhanced initial access procedure is a procedure evolved from the conventional initial access procedure. In addition to the enhanced initial access procedure, the present invention proposes a new synchronization channel (hereinafter, referred to as enhanced SCH (ESCH)) and a new PBCH (hereinafter, referred to as enhanced PBCH (EPBCH)) for the enhanced initial access procedure.

The enhanced initial access procedure may address problems including PBCH collision under the eICIC situation, the UE failing to properly implement the initial access procedure when the EPDCCH is transmitted alone without the PDCCH, poor guarantee of flexibility in selecting an initial access procedure by a UE capable of decoding both the PDCCH and the EPDCCH, and ambiguity of the initial access procedure of the UE for a new carrier type. In the following description, a UE having a capability of decoding EPBCH and E-PDCCH will be referred to as an advanced UE, and the other UEs for LTE/LTE-A will be referred to as legacy UEs. In addition, in the following description, the SCH may be called a first SCH, the ESCH being called a second SCH, the PBCH being called a first PBCH, and the EPBCH being called a second PBCH.

Enhanced SCH (ESCH)

ESCH proposed in the present invention may have at least one of the following properties.

First, unlike the conventional SCH transmitted only in a specific subframe, the ESCH may be transmitted in any subframe. However, the ESCH may be the same as the conventional SCH in that each of the PSS and the SSS is transmitted twice in a radio frame and the transmission period of each signal is 5 ms.

Second, a parameter for generation of sequences (i.e., PSS and SSS sequences) to be transmitted on the ESCH may be different from that of the SCH. More specifically, the root index u for generation of a PSS for the ESCH may be selected from a set range completely different from that of the root index for the SCH. In addition, the ESCH may) employ a cell ID group $N_{ID}^{(1)}$ for generation of an SSS, e.g., a virtual cell ID which is different from that for the cell ID group for the SCH. This is intended to prevent the legacy UEs from detecting the ESCH.

Third, a cell ID provided to a UE on the ESCH may indicate information associated with EPBCH and EPDCCH. Herein, the cell ID may represent at least one of an ID (or sequence index) obtained through PSS detection, an ID (or sequence index) obtained through SSS detection, or a cell ID finally obtained from a PSS/SSS detection result. In addition to the ID detected from ESCH, the cell ID may represent an ID that is acquired from the SCH, but indicates reception of an EPBCH as it is within a predetermined range. Information related to the EPBCH and EPDCCH may include the following information items.

i) Position Information about EPBCH

Information about time, frequency domain and position in which EPBCH is transmitted may be inferred from the cell ID. For example, a plurality of EPBCH position candidates is predetermined, and one of the candidates may be determined by the cell ID. Alternatively, a plurality of EPBCH candidate sets may be defined, one of the sets may be determined by the cell ID, and blind decoding may be performed for the candidates in the determined set.

ii) EPBCH RS Information

Configuration (e.g., an antenna port, a scrambling parameter, etc.) of an RS used for EPBCH decoding may be inferred from the cell ID. In the inferring process, modulo operation, which will be described later, may be used.

iii) Common Search Space (CSS) Position Information

Information about time/frequency at which a CSS of a cell is positioned may be inferred from the cell ID (wherein, CSS may represent a CSS transmitted on an EPDCCH, and also suggest that the position of the CSS transmitted over the EPDCCH may depend on respective subframes (or subframe sets)). If information about the CSS is not transmitted on the EPBCH, which will be described later, CSS position information should be inferred from the cell ID. As in the case of EPBCH position information, to inferred the CSS position information, a plurality of CSS position candidates may be predetermined, and one of the candidates may be determined by the cell ID. Alternatively, a plurality of CSS candidate sets may be defined, one of the sets may be determined by the cell ID, and blind decoding may be performed for the candidates in the determined set.

iv) CSS RS Information

If information about the CSS is not transmitted on the EPBCH, configuration (e.g., an antenna port, a scrambling parameter, etc.) of an RS used for EPDCCH CSS decoding may be inferred from the cell ID through, for example, the modulo operation, as in the cased of the EPBCH RS. If the position of the CSS is determined without linkage with the cell ID, the EPDCCH CSS may be predetermined based on the system bandwidth. For example, if the number of PRB pairs used for the CSS is 4, a pattern of distributing the four PRB pairs in each system bandwidth to a maximum extent may be predetermined, and the UE may assume, upon obtaining a system bandwidth through decoding of the (E)PBCH, PRB pairs for the CSS based on the bandwidth. Additionally, the present invention also covers a case in which a different number of PRB pairs is used for the CSS depending on system bandwidth.

v) DMRS Configuration of EPBCH and/or E-PDCCH

Through modulo operation of a cell ID obtained by detecting an ESCH, a port number, port index and scrambling parameter of a CSS of an EPBCH and/or E-PDCCH/E-PDCCH may be obtained.

In order to indicate information associated with the EPBCH and the EPDCCH through the cell ID, i.e., to infer information associated with the EPBCH and the EPDCCH from the cell ID, the modulo operation described above may be used. For example, a relationship between an EPBCH antenna port and the cell ID may be set to 'cell ID modulo 9', and an antenna port for a calculated value may be inferred from the configurations exemplarily shown in Table 1 below. With this method, the number of times of blind decoding for the port of the EPBCH may be reduced, and signaling overhead for the E-PDCCH configuration may be reduced (Table 1 assumes 7, 8, 9, and 10 as the antenna port numbers, but the numbers may be denoted by 107, 108, 109, and 110 depending on a notational system. Increase of the number of antenna ports to transmit the EPDCCH involves corresponding increase in the port number.)

TABLE 1

| Result value of (cell ID) mod 9 | Antenna port |
|---|---|
| 0 | 7 |
| 1 | 8 |
| 2 | 9 |
| 3 | 10 |
| 4 | 7, 8 |
| 5 | 7, 9 |
| 6 | 9, 10 |
| 7 | 8, 10 |
| 8 | 7, 8, 9, 10 |

The above example may be applied to the above-described conditions i) to v) inferred from the cell ID in the same/similar manner.

Enhanced PBCH (EPBCH)

EPBCH proposed in the present invention may have at least one of the following properties.

First, the EPBCH may be transmitted in a subframe in which the ESCH described above is transmitted. For example, the EPBCH may be transmitted in the same subframe as the first ESCH transmitted within a radio frame (In FDD, the EPBCH may be transmitted in a subframe in which a PSS/SSS is transmitted. In TDD, the SSS is transmitted in a subframe prior to the subframe for transmission of the PSS, and thus the EPBCH is preferably transmitted in the subframe in which the SSS is transmitted). Thereby, even when a radio frame boundary (between an aggressor cell and a victim cell) is aligned, broadcast information may be transmitted using different subframes, thereby implementing PBCH protection. For this process, neighboring eNBs may exchange information about a subframe in which the EPBCH is transmitted, through, for example, X2 signaling. In the subframe, the EPBCH may be transmitted in a resource region in which the conventional PBCH is transmitted, or may be transmitted in a resource region according to the EPBCH structure, which will be described later.

Second, the EPBCH may be based on a DMRS. Since the EPBCH is broadcast information, a shared DMRS may be used to allow multiple UEs to perform decoding. Herein, the shared DMRS may have a property of random beamforming or be subjected to pre-defined precoding (e.g., identity matrix (no precoding)). Scrambling information for detection of the DMRS may be pre-defined, or a cell ID may be applied to a scrambling sequence to detect the DMRS. To this end, the eNB may define a virtual cell ID, and perform scrambling in consideration of the virtual cell ID in generating a scrambling sequence for a signal transmitted on the ESCH.

Third, the EPBCH may include information about subframe offset from a frame boundary. Since the EPBCH may be transmitted in any subframe in a radio frame, the information about offset from the frame boundary is needed to indicate the subframe in which the EPBCH is transmitted in the radio frame. A UE to decode the EPBCH may recognize a slot boundary with a 10 mm period through the ESCH, but recognize the frame boundary only after decoding the EPBCH.

Fourth, an E-PDCCH CSS resource information may be delivered on the EPBCH. Unlike the conventional PDCCH, the E-PDCCH does not reserve a specific symbol. Therefore, the E-PDCCH CSS region is preferably signaled over the EPBCH. To this end, a starting resource of the CSS may be indicated in time/frequency. Alternatively, a predetermined region may be used. When CRS, CSI-RS and IMR are transmitted to the E-PDCCH CSS, rate matching may be performed around the corresponding resource in consideration of reliability. In this case, information such as rate matching information about the E-PDCCH may be signaled to the UE over the EPBCH. Signaling may indicate whether or not rate matching has been performed for each of CRS, CSI-RS and IMR, or directly indicate, using, for example, a bitmap, a resource for which rate matching is performed. Alternatively, the signaling may indicate the RS configuration, and indicate that rate matching has been performed at the corresponding RS position.

Fifth, the EPBCH may include E-PDCCH RS configuration information. That is, to reduce the number of times of blind decoding by the UE, RS configuration (e.g., antenna port numbers, scrambling parameters, etc.) used in transmitting the E-PDCCH may be indicated through the EPBCH. It is also possible to predetermine the RS configuration of the CSS. For example, it may be assumed that the information delivered through the CSS is transmitted by random beamforming using ports 7 and 9.

Sixth, the EPBCH may be transmitted at each transmission point. In the case of the conventional PBCH, the PBCH is transmitted based on CRS, and therefore it is not possible for an eNB and a radio remote head (RRH) sharing a cell ID as in CoMP scenario 4 to transmit different PBCHs. This may mean that resource allocation for UEs in an RRH cell and the subframe structure depend on a macro eNB, and may not be preferable in terms of flexibility. This problem may be solved by transmitting an EPBCH at each transmission point. If the EPBCH is transmitted at each transmission point, control of PBCH collision and interference may be more easily implemented, and a UE is allowed to perform initial access to a corresponding transmission point, and thus latency, which is caused when the UE is handed over to the RRH cell after performing initial access to the macro eNB, may be significantly lowered.

Structure of Enhanced PBCH (EPBCH)

As briefly described above, the EPBCH may be transmitted in the same frequency/time resource as the conventional PBCH. In this case, transmission of PDSCH and EPDCCH may be inefficient. More specifically, if a CRS (e.g., a new carrier type (NCT)) is not transmitted, for example, the EPBCH broadcasts common (system) information to UEs, and thus it is proper to use, as a shared RS, a DMRS in a PRB pair in which the EPDCCH is transmitted. In addition, it is preferable in the aspect of resource utilization to transmit the PDSCH and the EPDCCH in the remaining region in the PRB pair other than the EPBCH region. In this case, use of the DMRS port may be limited since the PDSCH may have to use a shared RS even though it is possible to form a beam favorable for a UE for which the corresponding region is scheduled, or a port that is not used for the PBCH needs to be used for beamforming. The EPDCCH may also suffer a similar problem. If the EPDCCH is configured in the corresponding region, a scheme other than the normal PRB pair needs to be sought in the steps of configuring a search space and determining position candidates, and thus complexity may increase. Further, if the PBCH is transmitted in the six RBs in the middle of the bandwidth as in the conventional cases, an additional interference reduction technique may be needed when inter-cell (E)PBCH collision occurs.

To address such problems, the EPBCH structure according to an embodiment of the present invention may have a region for transmission of the EPBCH expanded in the time domain and narrowed in the frequency domain, compared to the case of the conventional PBCH. Thereby, an EPBCH resource has an increased number of OFDM symbols and a reduced number of PRB pairs, compared to the PBCH. Herein, the number of PRB pairs used for transmission of the EPBCH may be predetermined. Regarding the number of PRB pairs, the following two examples may be considered.

As the first example, when 4 port CRSs are assumed, the conventional PBCH is transmitted in a subframe using 240 REs. If DMRS overhead is 24, only the DMRS is rate-matched, and the EPBCH is transmitted using a whole PRB pair, 144 REs may be used to transmit the EPBCH. Accordingly, when two PRB pairs are used for transmission of the EPBCH, a coding rate lower than the coding rate of the conventional PBCH may be achieved, and thus two PRB pairs may be preset to be used for transmission of the EPBCH.

As the second example, there may be a case in which a DMRS as well as a tracking RS (TRS, which may be positioned on a CRS resource of antenna port 0), a CSI-RS, and an SCH are transmitted in a subframe in which the EPBCH is transmitted, and the NCT undergoes strong interference from a neighboring cell PDCCH (i.e., a case in which the EPBCH is not transmitted at the starting portion of the subframe for ICIC). In this case, the number of REs usable for transmission of the EPBCH is significantly reduced, and therefore three PRB pairs may be preset to be used for EPBCH transmission.

As in the examples described above, using a plurality of PRB pairs for EPBCH transmission may be advantageous in terms of beamforming, resource utilization, and complexity of a search space since a PRB pair that is not used for EPBCH transmission among the existing 6 PRB pairs is usable for the PDSCH or EPDCCH. In addition, all or some of the OFDM symbols may be used for EPBCH transmission. For example, the EPBCH may be defined to be mapped to the OFDM symbols excluding OFDM symbols #0, #1, and #13, and the excluded symbols may be used for the purpose of ICIC or synchronization.

In the exemplary EPBCH structure described above, in consideration of inter-cell EPBCH collision, a plurality of EPBCH candidates may be set, and a UE may detect, through blind decoding, a PRB pair in which an actual EPBCH is transmitted among the candidates.

In this case, a region in which EPBCH candidates are positioned in the frequency domain may be predetermined. For example, the EPBCH candidates may be positioned in the 6 PRB pairs in the middle of the entire system frequency bandwidth in which the conventional PBCH is transmitted, which may be useful in the case in which a UE does not recognize the system bandwidth of the corresponding cell in the step of decoding the EPBCH. In another example, the region in which EPBCH candidates are positioned may be set to PRB pairs in which an (E)SCH is transmitted or to the PRB pairs in which the (E)SCH is transmitted and the PRB pairs including the corresponding region.

That is, as shown in FIG. 13(a), the 6 PRB pairs in the middle of the entire frequency band may be a resource region in which EPBCH candidates (EPBCH candidates #0, #1, and #2) can be positioned. While two consecutive PRB pairs are illustrated as constituting EPBCH candidates in FIG. 13(a), non-consecutive PRB pairs may be used to constitute EPBCH candidates in consideration of frequency diversity and the like. Even in this case, the position of the EPBCH or EPBCH candidates is preferably predetermined. In addition, if consecutive PRB pairs constitute an EPBCH or if PRB pairs constituting an EBPCH are positioned sufficiently close to each other in the frequency domain, PRB bundling may be performed in terms of DMRS to improve channel estimation performance. In addition, while FIG. 13(a) illustrates three EPBCH candidates, there may be two or more candidates with a PRB pair from one candidate overlapping another PRB from another candidate to ensure flexibility.

The UE may recognize that a cell (or NCT cell) transmits an EPBCH, based on pre-provided information (about, for example, the step of detecting an ESCH, which will be described later), and perform blind decoding for EPBCH candidates #0, #1, and #2 present in the 6 PRB pairs in the middle of the entire frequency bandwidth to detect the position for EPBCH transmission in a cell.

FIG. 13(b) illustrates a case in which EPBCH candidates are positioned in a resource region in which the (E)SCH is transmitted. This example includes a case in which the ESCH is not transmitted in the 6 RBs in the middle of the entire frequency band and a case in which EPBCH candidates occupy a region more than 6 RBs.

Figure 13:
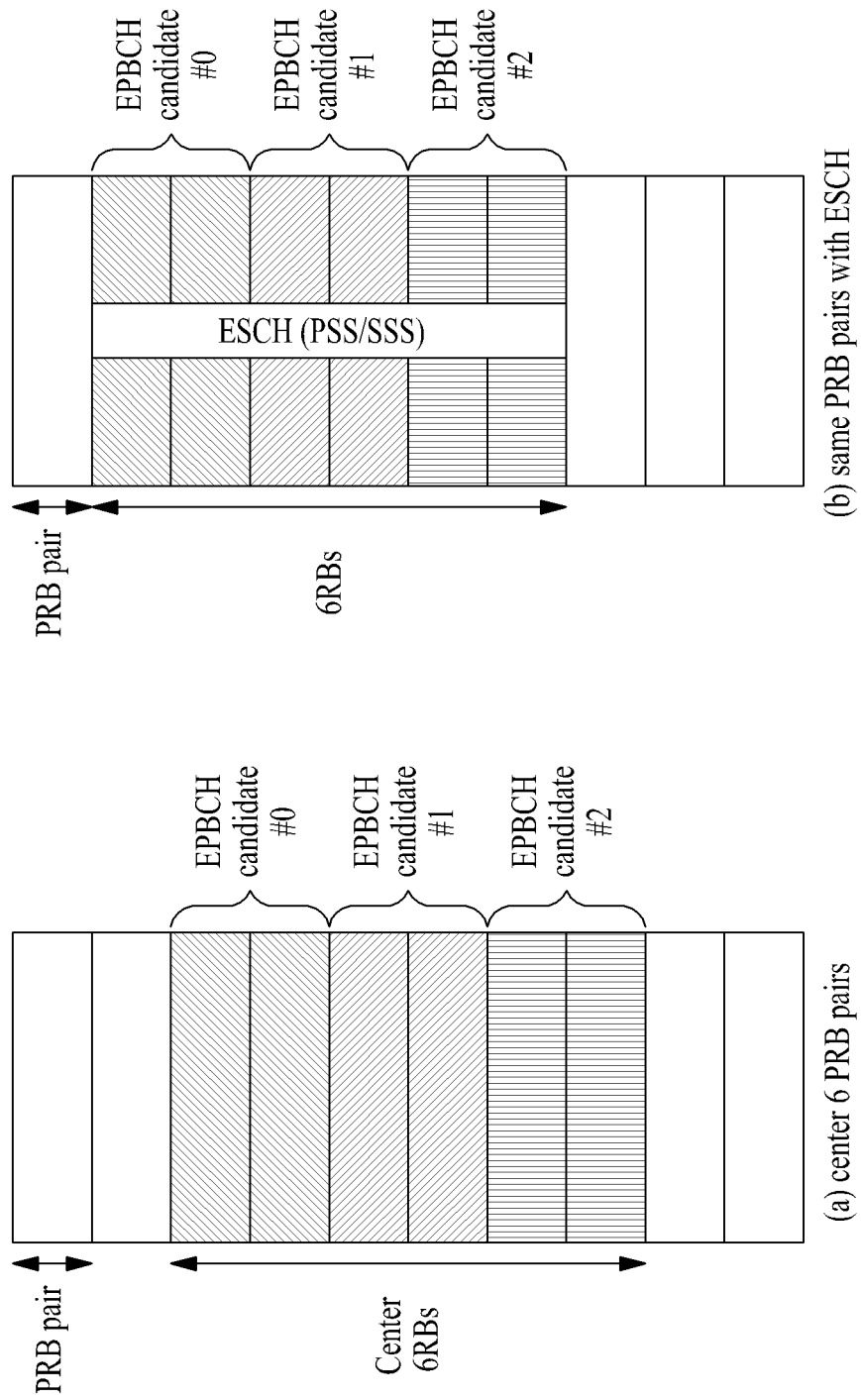
FIG. 13 illustrates a PBCH structure according to one embodiment of the present invention.

In FIG. 13, a UE may perform blind decoding for all PBCH candidates, or a cell ID may be set to indicate which one of PBCH candidates is an EPBCH that the UE should receive. For example, an equation k=cell ID mod 3 (k is an index of a PBCH candidate) may be used. If k=0, linkage between the cell ID and a resource region in which the EPBCH is transmitted may be set so as to suggest that the EPBCH is transmitted on EPBCH candidate #0 in FIGS. 13(a) and 13(b). A time domain offset (i.e., a subframe offset between the ESCH (or EPSS, ESSS) and the EPBCH) may be set in the same manner, linkage with the cell ID may be set through a combination of time/frequency positions.

Enhanced Initial Access Procedure/Method

Hereinafter, a description will be given of an initial access procedure employing at least one of the ESCH and EPBCH proposed in the present invention as described above.

When the ESCH and EPBCH described above are considered, the initial access procedure may include i) random access based on SCH reception, PBCH reception, and PDCCH, ii) random access based on SCH reception, EPBCH reception, and EPDCCH, iii) random access based on ESCH reception, EPBCH reception, and EPDCCH.

That is, a legacy UE which is not capable of receiving the ESCH and the EPBCH may operate according to an initial access procedure in a legacy LTE/LTE-A system that receives the SCH and the PBCH, while an advanced UE capable of receiving the ESCH and the EPBCH may operate according to an initial access procedure in which random access based on reception of SCH/ESCH, EPBCH reception, and EPDCCH is performed.

The aforementioned initial access procedures may be determined depending on a cell ID. More specifically, the cell ID may be divided into at least two ranges (three ranges when NCT is considered), and the initial access procedures may be mapped to the respective ranges. For example, in a legacy LTE/LTE-A system, there are 504 cell IDs. Of the cell IDs, cell IDs 0 to x may be mapped to an initial access procedure according to a random access procedure based on SCH, PBCH, and EPDCCH, and cell IDs x to 504 may be mapped to an initial access procedure according to a random access procedure based on EPBCH and EPDCCH. Herein, cell IDs x to 504 may be acquired by one of the SCH and the ESCH. In the legacy LTE/LTE-A system, usage of the cell IDs may be unchanged, but the cell IDs in at least one range for the enhanced initial access procedure may be allocated.

A legacy UE acquires a cell ID by receiving an SCH. At this time, since the cell ID is for a random access procedure which is based on PBCH and PDCCH, the legacy UE performs the conventional initial access procedure.

When an advanced UE acquires a cell ID by receiving an SCH/ESCH, it performs an initial access procedure depending on the range in which the cell ID is arranged. If the cell ID is between x and 504, the advanced UE will receive an EPBCH and perform an EPDCCH-based random access procedure. Herein, information that is needed for the advanced UE to receive the EPBCH/EPDCCH may be acquired through the configurations/methods described above regarding the ESCH and EPBCH. If the advanced UE receives SCH first, the number of sequences for which blind decoding should be performed may be kept the same as in conventional cases.

Figure 14:
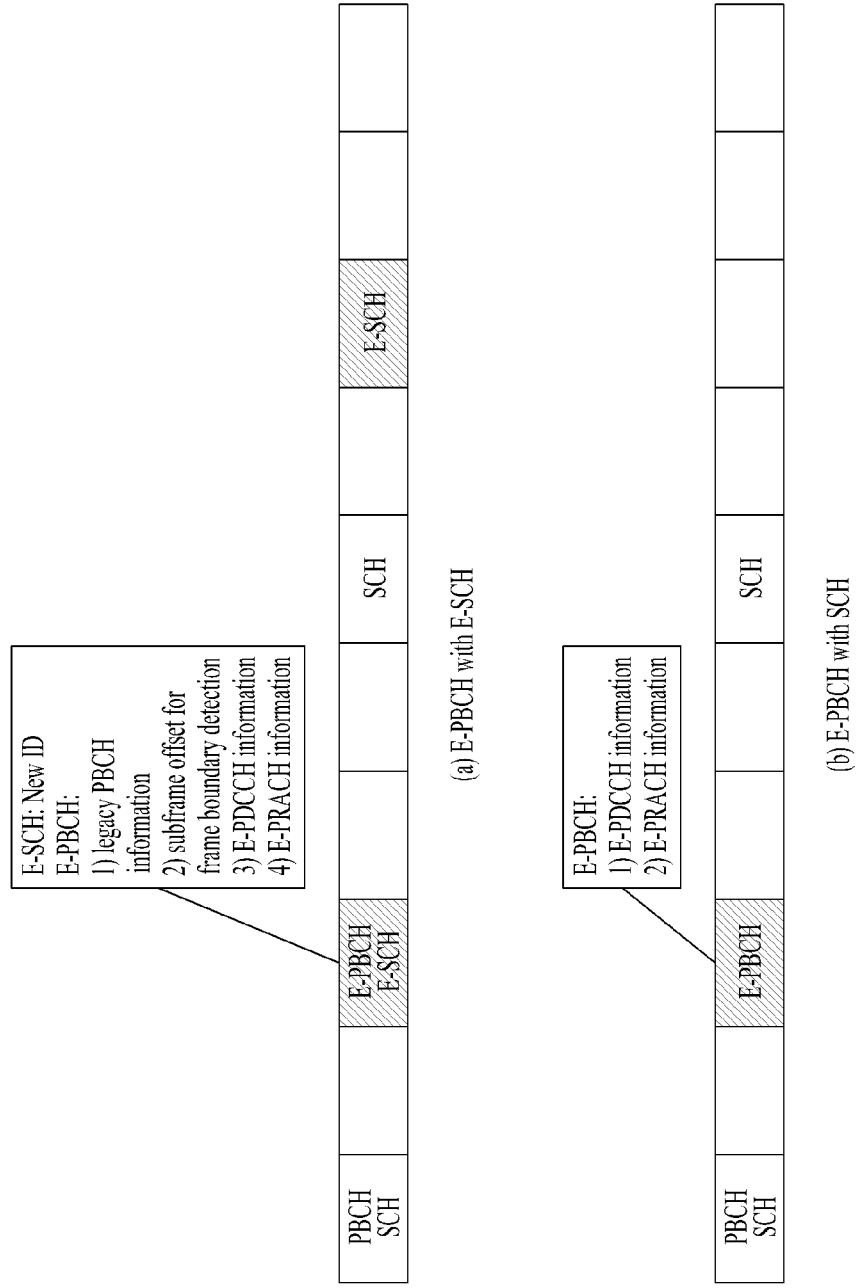
FIG. 14 illustrates an initial access procedure according to one embodiment of the present invention.

If the advanced UE is configured to receive the SCH first rather than the ESCH to start the initial access procedure, when a cell ID detected through the SCH indicates that an EPBCH should be received, the EPBCH may be set to be transmitted in a position spaced a certain number of subframes from the corresponding subframe. In addition, a subframe offset between the SCH and the EPBCH may be preset (to, for example, 2 subframes) or inferred from the detected cell ID (as, for example, cell ID modulo 5). In this case, through one SCH, the legacy UE may recognize the position of the PBCH, and the advanced UE may recognize the position of the EPBCH. Accordingly, waste of resources may be prevented. At this time, if the advanced UE decodes the PBCH, the EPBCH may not include the subframe offset and information transmitted on the legacy PBCH. That is, the EPBCH may include only information about the EPDCCH and/or EPRACH. FIG. 14(*a*) exemplarily shows information that may be included in the EPBCH in the case in which the UE receives the SCH and the EPBCH, FIG. 14(*b*) exemplarily shows information that may be included in the EPBCH in the case in which the UE receives the ESCH and the EPBCH. In FIG. 14(*a*), New ID may indicate a case in which the eSCH is scrambled with a cell ID outside of the conventional cell ID range. The EPBCH may include a subframe offset indicating the position of a subframe in which the E-SCH and the EPBCH are transmitted within a radio frame, information for EPDCCH (e.g., EPDCCH antenna port information, E-CSS information, etc.), and information for EPRACH (e.g., EPRACH configuration, etc.). However, embodiments of the present invention are not limited thereto. The EPBCH may also include information mentioned above regarding the EPBCH. FIG. 14(*b*) illustrates an embodiment of a method employing a combination of the conventional SCH and the EPBCH, in which information about a subframe in which the EPBCH is transmitted is obtained using the cell ID detected through the SCH. The EPBCH may include information about the E-PDCCH and E-PRACH except for the subframe offset. The EPBCH may also include information that is transmitted over the conventional PBCH.

Meanwhile, since the legacy UE recognizes information about a subframe and OFDM symbol in which the conventional PBCH and SCH are transmitted, the legacy UE decodes a PDSCH transmitted in a region (an RB unit), assuming that the eNB performs rate matching at the corresponding position. However, since the legacy UE does not recognize whether or not the EPBCH and E-SCH are transmitted, the eNB may not schedule a time/frequency resource for transmission of the EPBCH and E-SCH for the legacy UE.

In addition, to ensure flexibility in allocating time/frequency resources for transmission of E-SCH and EPBCH, the time/frequency resources in which the E-SCH and EPBCH are transmitted may be set to change at certain time intervals. The legacy UE may ensure backward compatibility by not scheduling a corresponding resource. On the other hand, the advanced UE accessing a cell may be assigned ESCH/EPBCH and the like for use for PDSCH transmission. At this time, if UEs are assigned with an RB for transmission of ESCH, EPBCH and the like for use for PDSCH transmission, the eNB may indicate, through higher-layer signaling, transmission of the ESCH/EPBCH or the position and amount of a resource for which rate matching is performed, in order to accurately perform the PDSCH demodulation. A UE receiving the signaling may perform PDSCH demodulation, assuming that a PDSCH is not mapped to the signaled resource.

Application to New Carrier Type (NCT)

The descriptions have been given above of a case in which a legacy UE and an advanced UE are present in the same cell. The descriptions, however, may be applicable to a cell (e.g., a cell to which NCT is applied) which is accessible only by the advanced UE. Herein, a control region (e.g., the PDCCH region) in a conventional LTE/LTE-A may be not present in the NCT, and the CRS may not be transmitted, or may be partially transmitted in terms of time/frequency and port.

Hereinafter, additional details for implementation of more efficient initial access in a situation such as NCT will be described.

In the case of the NCT, an ESCH may be transmitted at the same time/frequency resource position as that for an SCH. In this case, in the ESCH detection step, a subframe/slot boundary and a frame boundary may be detected. Alternatively, as described above regarding the ESCH, the ESCH may be transmitted in any position within a radio frame in which the SCH is transmitted.

Another problem that should be considered in transmitting and receiving an ESCH in the NCT is that there is not any known signal such as the CRS for which fine tuning/tracking may be performed in the frequency or time domain. Since the CRS may not be transmitted in the NCT, the conventional CRS may be partially used or a new RS (e.g., a TRS) may be used for tracking. Accordingly, a TRS may be transmitted in a subframe in which the ESCH is transmitted. This means that whether or not to transmit the TRS may be determined by a carrier type and the like, and that it is necessary to allow a UE to recognize the carrier type in the synchronization process. In other words, this means that it is necessary to allow the UE to recognize, in the synchronization process, whether the carrier is an NCT carrier. Accordingly, ESCH configurations (e.g., transmission position, sequence type, cell ID, etc. of the ESCH) may be set to indicate whether the carrier type of a cell is the NCT. For example, in the case in which the advanced UE detects a new cell ID (e.g., a cell ID out of the conventional cell ID range (i.e., a cell ID undetectable by the legacy UE)) in detecting an ESCH, the advanced UE may recognize that the carrier type of the corresponding cell is NCT, and that a CRS is not transmitted in the cell and a TRS is transmitted in the subframe where the ESCH has been detected. Herein, the new cell ID may be configured by adding a group ID according to the conventional PSS. That is, 168 new physical cell IDs may be generated by adding a group ID for the PSS and may be allocated to an NCT-based cell. If a default CSI-RS configuration is defined for tracking in the NCT, the UE having recognized through the ESCH that the cell is an NCT cell may perform additional tracking using the default CSI-RS configuration. Herein, the sequence of the default CSI-RS configuration is initialized to the cell ID of the cell, and the position thereof may be predetermined (e.g., the sequence may be transmitted in the center 6 PRB pairs).

As another method to identify an NCT cell, the TRS used in an NCT cell may be initialized to a value other than that of a physical (serving) cell ID. The UE may infer a virtual cell ID used for initialization of the TRS from the cell ID acquired through the (E)SCH, and attempt to detect the TRS using the virtual cell ID. In the case in which the TRS is detected, the UE may recognize that the cell is an NCT-based cell. Herein, a virtual cell ID may be inferred by applying a specific offset to the detected cell ID or by setting an offset with the virtual cell ID or linkage to the virtual cell ID through the modulo operation of the detected cell ID. The subframe in which the TRS is transmitted may be a subframe in which the (E)SCH is transmitted, or an offset between the subframe in which the (E)SCH is transmitted and the subframe in which the TRS is transmitted may be inferred in the same manner as in inferring the virtual cell ID. Alternatively, the subframe offset (e.g., 0, 1, 2, 3, etc.) from the subframe in which the (E)SCH is transmitted may be predetermined. If a subframe in which the TRS is transmitted is not determined, the UE may perform TRS detection through blind decoding for each subframe.

As another method of recognizing that a cell is operating as an NCT cell, CRS detection may be considered. This means that the cell is assumed to operate based on the NCT if a CRS is not detected in normal subframes on the condition that the CRS is not transmitted in the normal subframes. Herein, the normal subframe may refer to a subframe in which the CRS is not transmitted, a subframe in which the TRS is not transmitted, or a subframe in which the (E)SCH ((E)PSS/(E)SSS) is not transmitted. This method may be implemented for all ports and OFDM symbols in a subframe, but it is preferably implemented by limiting the detection range to a specific port, a specific symbol, a specific port of a specific symbol, and the like to reduce complexity. For example, the UE may perform detection of port 0 of the first OFDM symbol of the subframes in which the (E)SCH is not transmitted, thereby determining whether the cell operates based on the NCT. In this case, the frequency domain may be limited to the 6 PRB pairs in the middle of the bandwidth. This may mean that the CRS detection for determining whether the cell is based on the NCT is operated as a part of the synchronization process. The UE performs the operations of inferring and checking of a cell ID in the synchronization process. The UE may check whether the inferred cell ID is valid through the CRS (or TRS) detection. In brief, the detection operation may be performed for multiple subframes in the process of CRS (or TRS) detection to determine whether a cell is an NCT-based cell, which may mean that whether a cell is an NCT-based cell is determined in the synchronization process.

Figure 15:
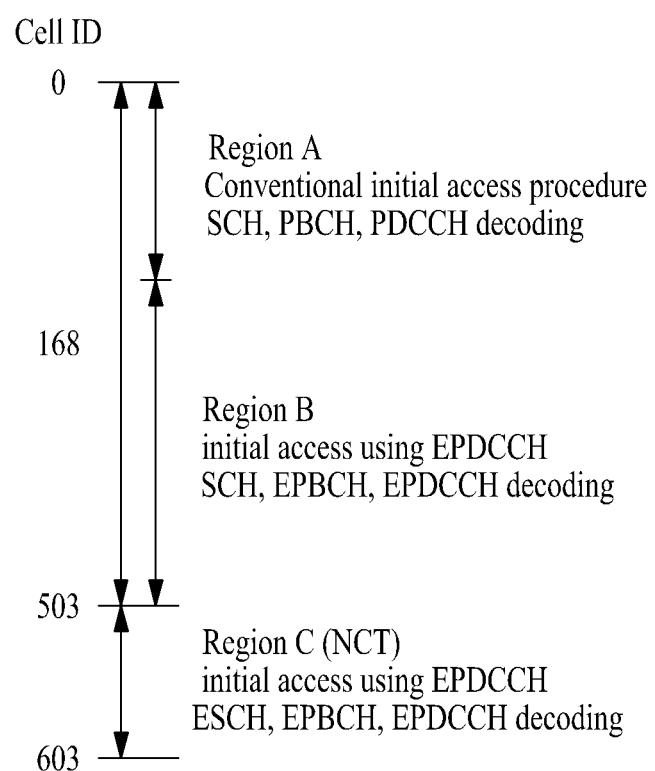
FIG. 15 illustrates an initial access procedure in NCT according to one embodiment of the present invention.

The cell ID-based initial access procedure described above may be applied to the NCT as follows. In the procedure, it may be identified whether a cell is a conventional cell or an NCT, based on the cell ID inferred from the (E)SCH. Then, decoding of the EPBCH and EPDCCH CSS may be performed according to the format of the cell. That is, as illustrated in FIG. 15, the cell ID may include three ranges. If a cell ID belonging to the first range (region A) is inferred, the UE may perform conventional operations such as decoding of a conventional PBCH. If a cell ID belonging to the second range (region B) is inferred, the UE may decode an EPBCH and use a CRS as a signal for tracking. If a cell ID belonging to the third range (region C), which represents the NCT, is inferred, the UE may decode the EPBCH and use an RS (e.g., TRS, default CSI-RS, etc.) for tracking. In addition, the start position of the EPBCH and EPDCCH may be differently set depending upon the range to which the cell ID belongs. For example, if the cell ID belongs to the first/second range (region A/B), the EPBCH and EPDCCH may be transmitted in a region (i.e., PDCSCH region) after the PDCCH region. If the cell ID belongs to the third range (region C), the start position of the EPBCH and EPDCCH may be assumed to be the first OFDM symbol of a subframe. Additionally, If the cell ID belongs to the second range (region B), a new field may be added to the conventional PBCH in place of the EPBCH to indicate information about the EPDCCH CSS (i.e., to indicate, for example, the position of the CSS, a PRB pair for the CSS, an RS configuration for CSS demodulation, and the like, or to combine these items and indicate a corresponding index through the new field of the PBCH.)

Figure 16:
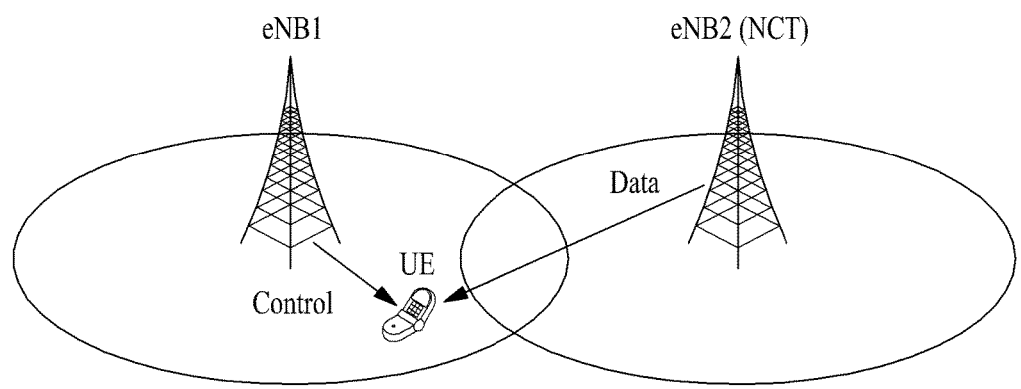
FIG. 16 is a diagram illustrating signaling needed in an NCT circumstance

FIG. 16 shows a serving cell configured to perform CoMP with an NCT cell. In FIG. 16, the serving cell of the UE is eNB 1, but it is assumed that the eNB 1 receives data from eNB2 serving as an NCT cell for a certain time. In this case, since a DMRS having an amount less than that of the CRS in transmission, is used, accuracy of estimation of large-scale properties such as frequency offset, delay spread, received timing, received power, and Doppler spread may be lowered. Accordingly, in this case, "quasi co-location" information (i.e., a TP/signal having a "quasi co-location" relationship with the DMRS that the UE uses for data demodulation) may be signaled to the UE. If the UE is aware of information about TPs in the same CoMP set, it may be signaled that a specific TP (or specific signal transmitted from the specific TP) has a "quasi co-location" relationship with the UE (or a DMRS transmitted from the serving eNB of the UE). In the case of NCT, it may be signaled that the TRS periodically transmitted for tracking has a "quasi co-location" relationship with the UE (or DMRS of the UE). In the case of PDSCH, an eNB may indicate whether or not specific signals have a quasi co-location relationship. In the case of (e)PBCH, however, the quasi co-location relationship is preferably predetermined since the quasi co-location relationship needs to be identified before access to the cell. Therefore, to improve the channel estimation performance for the (E)PBCH of the NCT, all or part of the TRS, (E)SCH ((E)PSS/(E)SSS), and EPDCCH CSS of a specific cell may be set to have a quasi co-location relationship with a DMRS used in transmitting the (E)PBCH of a corresponding cell. Having a quasi co-location relationship with the EPDCCH CSS means that DMRS used for EPDCCH CSS transmission has a quasi co-location relationship the DMRS used for (E)PBCH transmission, which in turn means establishment of a quasi co-location relationship between DMRSs transmitted to different resources. In addition, the quasi co-location relationship with the EPDCCH CSS may be applied only to specific DCI (e.g., DCI masked with SI-RNTI, P-RNTI, and RA-RNTU which need to be received even in the idle mode) in a CSS (DCI format 3/3A may be of an exceptional case). Additionally, the quasi co-location relationship may also be applied to a PDSCH (a DMRS used for the PDSCH) scheduled by such DCI. The UE may use corresponding signals to increase the accuracy of the large scale properties needed for (E)PBCH demodulation to improve the channel estimation performance.

Random Access Procedure According to Enhanced Initial Access Procedure

In a case in which the PBCH or SIB is decoded with an RS (a DM-RS, a DRS, or a CSI-RS) other than the (conventional) CRS, transmission may be performed over an EPBCH or Enhanced SIB (ESIB) (e.g., E-SIB-2) having newly defined information about an (E)RA message transmission resource (or ERA RNTI information). Particularly, when the system operates based on such scheme, for example, the eNB and the UE may consider (assume) that all operations used for the RA procedure and signaling (e.g., (E-)RA message transmission or (E-)RAR message reception) are performed based on the E-PDCCH. Herein, for example, the configuration of a DM-RS (or a DRS, a CSI-RS) antenna port used in decoding the EPBCH or E-SIB (or E-PDCCH) may be set to pre-fixed value(s) (e.g., DM-RS #7 (or #9) or DM-RS port #7, #8 (or #7, #9)). In addition, in a case in which multiple candidate DM-RS (or DRS, CSI-RS) antenna ports can be configured (e.g., two ports are selected from among DM-RS ports #7, #8, #9, and #10 (in a manner that, for example, an eNB selects a random number of predetermined antenna ports in a predetermined antenna port set)), the UE may recognize the antenna ports through blind decoding which is based on examination of a CRC (e.g., a CRC of E-MIB information (in EPBCH) masked with the number of (selected) antenna ports or the antenna port number). On the other hand, in another case in which DM-RS (or DRS, CSI-RS) antenna ports used for an E-SIB (or E-PDCCH) can be configured independently of the EPBCH, the eNB may additionally inform the UE of the information about the DM-RS (or DRS) antenna ports used in decoding the E-SIB (or E-PDCCH). The proposed schemes described above are applicable even to a case in which the UE receives information about an (E-)RA message transmission resource over the conventional PBCH or SIB, in addition to the case in which the UE receives the information about the (E-)RA message transmission resource based on the EPBCH or E-SIB scheme. For example, an indicator (or an information bit) for the operation of the E-PDCCH or PDCCH-based (E-)RAR message reception (or (E-)RA message transmission) (or information about the (E-)RA message transmission resource) may be transmitted over the conventional PBCH or SIB, and the UE may perform a corresponding specific RA operation procedure based on the received indicator.

Hereinafter, an example of the above-described EPRACH will be described in detail.

In an embodiment of configuration of a resource used for ERA message transmission, preamble sequence/time/frequency resources (including, for example, an offset of a time or frequency resource) used for RA message transmission may be (pre-) divided into resources for conventional PDCCH-based RA message transmission and resources for EPDCCH-based ERA message transmission, or resources used for EPDCCH-based ERA message transmission may be additionally configured. For example, the eNB may inform the UE of the information about such configurations by transmitting additional information bits to the UE over an SIB (e.g., SIB-2) or PBCH (or RRC signaling). As another example, the eNB may pre-distinguished between RA message resources according to the RA message transmission schemes, and inform the UE of how resources used for RA message transmission are divided (e.g., the number of groups of the divided RA message resources, the number of RA message resources included in a specific group, etc.) over an SIB (e.g., SIB-2) or PBCH (or RRC signaling) using an additional bit.

As an exemplary method for ERAR message reception, a specific region (e.g., a localized or distributed RB) or specific position (e.g., RB) in a downlink system bandwidth may be predefined as a CSS for EPDCCH, i.e., an ECSS. Herein, CRS-based decoding may be applied to the ECSS as in the case of a CSS of the conventional PDCCH. Or DM-RS (or DRS, CSI-RS) based decoding may be applied to the ECSS. For example, the UE may perform blind coding for the ECSS of the EPDCCH using an ERA RNTI (for example, a CRC of DCI including the scheduling information of an ERAR message is masked with the ERA RNTI) calculated based on a resource (e.g., Method A described above) used for ERA message transmission, thereby locating and decoding an ERAR message in the PDSCH region. Alternatively, the UE does not change the above-described ERA RNTI depending on a resource used for the ERAR message transmission (in the manner of, for example, determining a conventional RERNTI value), but may use a fixed value which the eNB allocates. Herein, the eNB may inform the UE of the information about the ERA RNTI over an (E)SIB (e.g., SIB-2) or (E)PBCH (or RRC signaling).

Alternatively, in the case in which a PBCH or SIB is decoded with an RS (DM-RS, DRS, or CSI-RS) other than the (conventional) CRS, information about an (E)RA message transmission resource (or ERA RNTI information) may be transmitted over a newly defined EPBCH or ESIB (e.g., ESIB-2). For example, when the system operates based such on scheme, the eNB and the UE may consider (assume) that all operations used for the RA procedure and signaling (e.g., (E)RA message transmission or (E)RAR message reception) are performed based on the EPDCCH. Herein, for example, the configuration of a DM-RS (or a DRS, a CSI-RS) antenna port used in decoding the EPBCH or ESIB (or EPDCCH) may be set to pre-fixed value(s) (e.g., DM-RS #7 (or #9) or DM-RS port #7, #8 (or #7, #9)). In addition, in a case in which multiple candidate DM-RS (or DRS, CSI-RS) antenna ports can be configured (e.g., two ports are selected from among DM-RS ports #7, #8, #9, and #10 (in a manner that, for example, an eNB selects a random number of predetermined antenna ports in a predetermined antenna port set)), the UE may recognize the antenna ports through blind decoding which is based on examination of a CRC (e.g., a CRC of EMIB information in EPBCH masked with the number of (selected) antenna ports or antenna port number). On the other hand, in another case in which DM-RS (or DRS, CSI-RS) antenna ports used for an E-SIB (or EPDCCH) can be configured independently of the EPBCH, the eNB may additionally inform the UE of the information about the DM-RS (or DRS) antenna ports used in decoding the ESIB (or EPDCCH). The proposed schemes described above is applicable even to a case in which the UE receives information about an (E-)RA message transmission resource over the conventional PBCH or SIB, in addition to the case in which the UE receives the information about the (E)RA message transmission resource based on the EPBCH or E-SIB scheme. For example, an indicator (or an information bit) for the operation of the E-PDCCH or PDCCH-based (E)RAR message reception (or (E)RA message transmission) (or information about the (E)RA message transmission resource) may be transmitted over the conventional PBCH or SIB, and the UE may perform a corresponding specific RA operation procedure based on the received indicator.

Hereinafter, a description will be given of a method for receiving an (E)RAR message in a UE based on the (E)RA message transmission schemes described above.

The UE receives information about resources (e.g., a preamble sequence/time/frequency) used for (E)RA message transmission over a (E)PBCH or (E)SIB (e.g., ESIB-2) (or RRC signaling), and transmits an (E)RA message based on the information. After this process, the UE performs blind decoding in both the CSS region of the conventional PDCCH and a specific region or position in the DL system bandwidth (the ECSS region for the EPDCCH) to receive an (E)RAR message. If DCI masked with a pre-defined ERA RNTI is detected in a specific (E)CSS, the UE follows the EPDCCH-based new ERA message transmission procedure described above. If DCI masked with a pre-defined RA RNTI is detected in a specific (E)CSS, the UE follows the conventional PDCCH-based RA message transmission procedure described above. Herein, the RA RNTI and the ERA RNTI may pre-divide the (entirety of) resources into two groups and inform the UE of corresponding information (e.g., the number of RNTIs used as ERA RNTIs among entire RNTI resources) over an (E)PBCH or (E)SIB.

Alternatively, the UE may receive, over an (E)PBCH or (E)SIB (e.g., ESIB-2) (or RRC signaling), information about resources (e.g., a preamble sequence/time/frequency) used for the (E)RA message transmission and information (e.g., an additional bit (or 1 bit flag)) about either the CSS region of the conventional PDCCH or the ECSS region of the newly defined EPDCCH from which the (E)RAR message is received. In addition, in one embodiment, the UE may perform either the PDCCH-based RA message transmission procedure or the EPDCCH-based new ERA message transmission procedure depending upon the position of the (E)RAR message received over the (E)PBCH or (E)SIB.

The above description is not only applicable to a case in which an RA message is transmitted for initial access, but also to a case in which an RA message (e.g., a PDCCH order) is triggered in a situation of acquisition of normal UL synchronization. In addition, the proposed schemes are also applicable to an extended carrier in a CA environment (for example, in the extended carrier, a CRS may be transmitted in some of the resource regions and operation may be performed based on a DM-RS (or DRS, CSI-RS) in the other regions (use of the EPDCCH is required)). The proposed schemes are also applicable to the case in which the UE performs, through the extended carrier region, EPDCCH (e.g., ECSS)-based initial access or handover (when, for example, a CoMP set includes transmission points sharing the same cell ID, and the UE attempts movement/access to another TP in the CoMP set).

Figure 17:
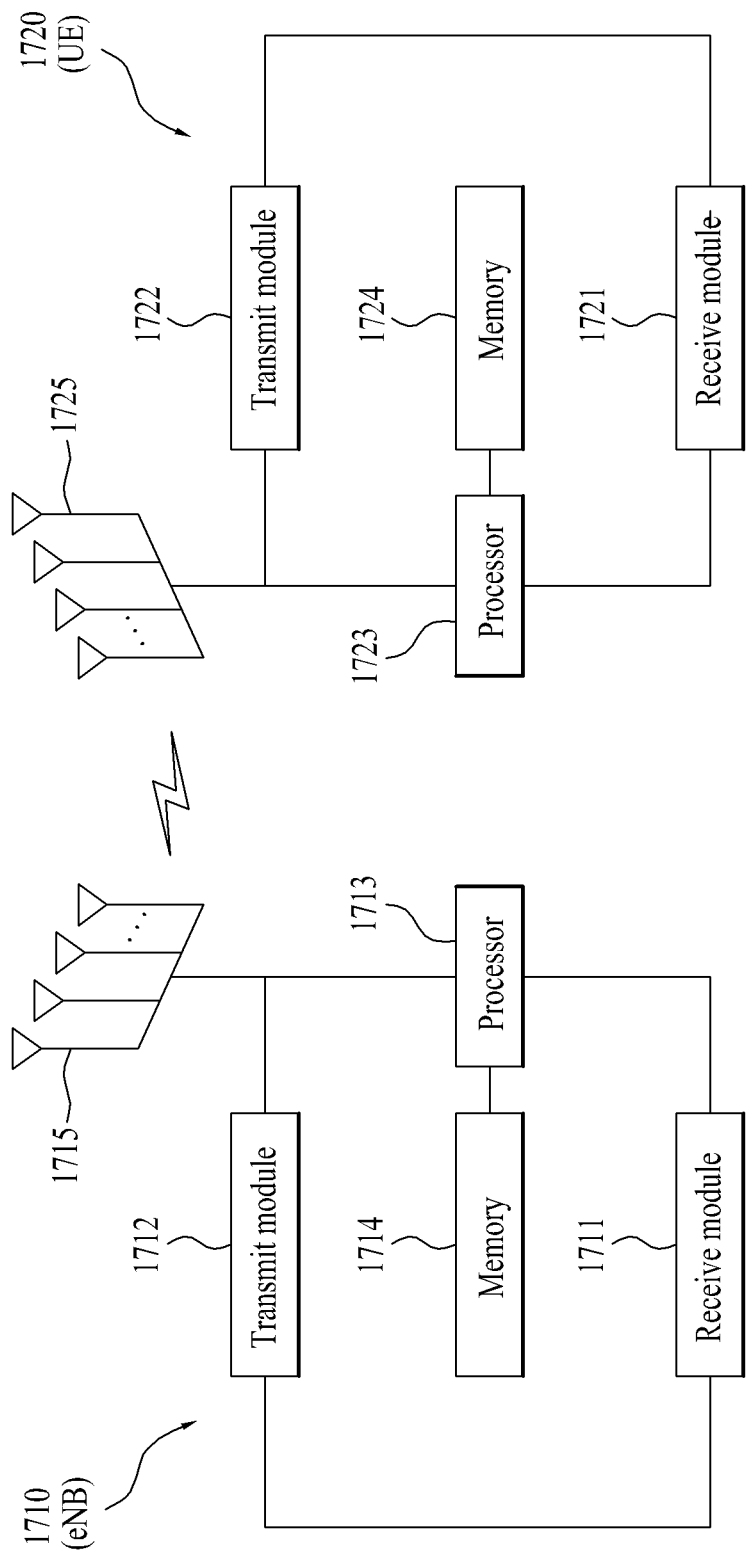
FIG. 17 is a diagram illustrating configuration of transceivers.

FIG. 17 is a diagram illustrating configuration of a transmission point apparatus and a UE according to one embodiment of the present invention.

Referring to FIG. 17, a transmission point apparatus 1710 may include a receive module 1711, a transmit module 1712, a processor 1713, a memory 1714, and a plurality of antennas 1715. The antennas 1715 represent the transmission point apparatus that supports MIMO transmission and reception. The receive module 1711 may receive various signals, data and information from a UE on uplink. The transmit module 1712 may transmit various signals, data and information to a UE on downlink. The processor 1713 may control overall operation of the transmission point apparatus 1710.

The processor 1713 of the transmission point apparatus 1710 according to one embodiment of the present invention may operate to implement the embodiments described above. Additionally, the processor 1713 of the transmission point apparatus 1710 may function to operationally process information received by the transmission point apparatus 1710 or information to be transmitted from the transmission point apparatus 1710, and the memory 1714, which may be replaced with an element such as a buffer (not shown), may store the processed information for a predetermined time.

Referring to FIG. 17, a UE 1720 may include a receive module 1721, a transmit module 1722, a processor 1723, a memory 1724, and a plurality of antennas 1725. The antennas 1725 mean that the UE supports MIMO transmission and reception. The receive module 1721 may receive various signals, data and information from an eNB on downlink. The transmit module 1722 may transmit various signals, data and information to an eNB on uplink. The processor 1723 may control overall operation of the UE 1720.

The processor 1723 of the UE 1720 according to one embodiment of the present invention may operate to implement the embodiments described above. Additionally, the processor 1723 may function to operationally process information received by the UE 1720 or information to be transmitted from the UE 1720, and the memory 1724, which may be replaced with an element such as a buffer (not shown), may store the processed information for a predetermined time.

The configurations of the transmission point apparatus and the UE as described above may be implemented such that the above-described embodiments are independently applied or two or more thereof are simultaneously applied, and description of redundant parts is omitted for clarity.

Description of the transmission point apparatus 1710 in FIG. 17 may be equally applied to a relay as a downlink transmitter or an uplink receiver, and description of the UE 1720 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. An initial access method for a user equipment (UE) in a wireless communication system comprising:
   acquiring, by the UE, information comprising a cell identification (ID) from a synchronous signal;
   receiving, by the UE, a first Physical Broadcast Channel (PBCH) through a first subframe and performing, by the UE, random access based on a Physical Downlink Control Channel (PDCCH), when the cell ID belongs to a first range of cell IDs; and
   receiving, by the UE, a second PBCH through a second subframe different from the first subframe and performing, by the UE, random access based on a first Enhanced Physical Downlink Control Channel (EPD-CCH), when the cell ID belongs to a second range or a third range of cell IDs;
   wherein the PDCCH is decoded based on a cell specific reference signal (CRS),
   wherein the EPDCCH is decoded based on a demodulation reference signal (DMRS),
   wherein the PDCCH is allocated in a control region of a third subframe, and
   wherein the EPDCCH is allocated in a fourth subframe and a starting position of the allocated EPDCCH varies depending upon a range to which the cell ID belongs.

2. The initial access method according to claim 1, wherein the first PBCH is transmitted on a time resource corresponding to a first four OFDM symbols of a second slot of the first subframe and a frequency resource corresponding to six center resource blocks in an entire frequency bandwidth, and the second PBCH is transmitted on a time resource corresponding to all OFDM symbols of the second subframe and a frequency resource corresponding to at least one part of six physical resource block pairs in the entire frequency bandwidth.

3. The initial access method according to claim 2, wherein, when the UE needs to receive the second PBCH, the UE performs blind decoding for the physical resource block pairs.

4. The initial access method according to claim 2, wherein the second subframe and the physical resource block pairs comprise a resource region, and the synchronous signal is transmitted in the resource region.

5. The initial access method according to claim 1, wherein the second subframe on which the second PBCH is transmitted is indicated by the cell ID.

6. The initial access method according to claim 1, wherein the second PBCH is based on the DMRS, and information for demodulating the DMRS is acquired from the cell ID.

7. The initial access method according to claim 6, wherein the information for demodulating the DMRS comprises information related to antenna ports and a scrambling sequence.

8. The initial access method according to claim 1, wherein the second PBCH comprises information related to a common search space of the EPDCCH.

9. The initial access method according to claim 8, wherein the information related to the common search space comprises at least one of resource region position information about the common search space and information related to antenna ports and a scrambling sequence for demodulating the DMRS.

10. The initial access method according to claim 1, wherein the cell ID is acquired by one of a first synchronization channel (SCH) or a second synchronization channel (E-SCH).

11. The initial access method according to claim 10, wherein a parameter for producing sequences to be transmitted on the first synchronization channel and the second synchronization channel is different between the synchronization channels.

12. The initial access method according to claim 1, wherein the second PBCH comprises information about frame timing.

13. The initial access method according to claim 1, wherein when the Cell ID belongs to the second range of cell IDs, the starting position of the allocated EPDCCH is set after the control region of the fourth subframe.

14. The initial access method according to claim 1, wherein when the Cell ID belongs to the third range of cell IDs, the starting position of the allocated EPDCCH is set by a first orthogonal frequency division modulation (OFDM) symbol of the fourth subframe.

15. A user equipment in a wireless communication system comprising:
    a receive; and
    a processor that:
    acquires information comprising a cell identification (ID) from a synchronous signal,
    controls the receiver to receive a first Physical Broadcast Channel (PBCH) through a first subframe and perform random access based on a Physical Downlink Control Channel (PDCCH) when the first PBCH is received, when the cell ID belongs to a first range of Cell IDs, and
    controls the receiver to receive a second PBCH through a second subframe different form the first subframe and perform random access based on an Enhanced Physical Downlink Control Channel (EPDCCH) when the second PBCH is received, when the Cell ID belongs to a second range or a third range of Cell IDs,
    wherein the PDCCH is decoded based on a cell specific reference signal (CRS),
    wherein the EPDCCH is decoded based on a demodulation reference signal (DMRS),
    wherein the PDCCH is allocated in a control region of a third subframe, and
    wherein the EPDCCH is allocated in a fourth subframe and a starting position of the allocated EPDCCH varies depending upon a range to which the cell ID belongs.

16. The initial access method according to claim 5, wherein the cell ID indicates a subframe offset indicating a subframe interval between a subframe on which the synchronous signal is transmitted and the second subframe on which the second PBCH is transmitted.

17. The user equipment according to claim 15, wherein the second subframe on which the second PBCH is transmitted is indicated by the cell ID.

18. The user equipment according to claim 17, wherein the cell ID indicates a subframe offset indicating a subframe interval between a subframe on which the synchronous signal is transmitted and the second subframe on which the second PBCH is transmitted.

19. The user equipment according to claim 15, wherein when the Cell ID belongs to the second range of cell IDs, the starting position of the allocated EPDCCH is set after the control region of the fourth subframe.

20. The user equipment according to claim 15, wherein when the Cell ID belongs to the third range of cell IDs, the starting position of the allocated EPDCCH is set by a first orthogonal frequency division modulation (OFDM) symbol of the fourth subframe.

\* \* \* \* \*